US005731797A

United States Patent [19]

Akiyama et al.

[11] Patent Number: 5,731,797

[45] Date of Patent: Mar. 24, 1998

[54] DRIVING METHOD FOR SPATIAL LIGHT MODULATOR AND PROJECTION DISPLAY SYSTEM

[75] Inventors: Koji Akiyama; Akifumi Ogiwara, both of Osaka; Hiroshi Tsutsui, Kyoto; Hisahito Ogawa, Nara; Yukio Tanaka, Osaka, all of Japan

[73] Assignee: Matsushita Electric Industrial Co., Ltd., Osaka, Japan

[21] Appl. No.: 539,314

[22] Filed: Oct. 4, 1995

[30] Foreign Application Priority Data

Oct. 6, 1994 [JP] Japan .................................... 6-242733

[51] Int. Cl.[6] ............................ H04N 5/74; G02F 1/135

[52] U.S. Cl. ................................................ 345/97; 345/96

[58] Field of Search ................................ 345/96, 97, 209

[56] References Cited

U.S. PATENT DOCUMENTS

| | | | |
|---|---|---|---|
| 4,389,096 | 6/1983 | Hori et al. | 350/339 R |
| 4,639,722 | 1/1987 | Urabe et al. | 340/784 |
| 4,738,515 | 4/1988 | Okada et al. | 350/350 S |
| 5,117,298 | 5/1992 | Hirai | 359/55 |
| 5,177,475 | 1/1993 | Stephany et al. | 340/784 |
| 5,178,445 | 1/1993 | Moddel et al. | 359/72 |
| 5,231,282 | 7/1993 | Nishi et al. | 250/214 LA |
| 5,260,815 | 11/1993 | Takizawa | 359/41 |
| 5,281,806 | 1/1994 | Nishi et al. | 250/214 LA |
| 5,416,621 | 5/1995 | Tanaka et al. | 359/72 |
| 5,436,742 | 7/1995 | Tanaka et al. | 359/56 |
| 5,583,676 | 12/1996 | Akiyama et al. | 349/28 |

FOREIGN PATENT DOCUMENTS

| | | |
|---|---|---|
| 0 573 989 | 12/1993 | European Pat. Off. . |
| 0 608 556 | 8/1994 | European Pat. Off. . |
| 0 617 312 | 9/1994 | European Pat. Off. . |
| 7-92484 | 4/1995 | Japan . |

OTHER PUBLICATIONS

Yukio Tanaka et al., "Analysis of Charge–Controlled Gray Scale in Ferroelectric Liquid Crystal Optically Addressed Spatial Light Modulator", Jpn. J. Appl. Phys. vol. 33 (1994) pp. 3469–3477, Part 1, No. 6A, Jun. 1994.

*Primary Examiner*—Mark R. Powell
*Attorney, Agent, or Firm*—Merchant, Gould, Smith, Edell, Welter & Schmidt, P.A.

[57] ABSTRACT

A driving method for a spatial light modulator can provide bright image, images of high contrast and resolution with no persistence and instability, and can be used in a projection display system. The spatial light modulator is prepared by sandwiching a ferroelectric liquid crystal layer between a first substrate and a second substrate. The first substrate is prepared by sequentially laminating a transparent conductive electrode and a photoconductive layer with rectifying properties on a glass substrate. On the photoconductive layer, a reflective layer and an alignment layer for aligning a liquid crystal layer are then laminated. The second substrate is prepared by laminating a transparent conductive electrode and an alignment layer on a glass substrate. Alternating current voltage having a waveform of inconsistent cycles is applied to a section between the transparent conductive electrodes.

26 Claims, 16 Drawing Sheets

DRIVING METHOD FOR SPATIAL LIGHT MODULATOR AND PROJECTION DISPLAY SYSTEM

FIELD OF THE INVENTION

This invention relates to a driving method for a spatial light modulator applied to optical processors, projection display systems, and the like, and further relates to a projection display system applying the driving method.

BACKGROUND OF THE INVENTION

Optically addressed spatial light modulators applying a liquid crystal layer basically include a photoconductive layer, a liquid crystal layer which has varying light transmittivity by the application of an electric field, and two transparent conductive electrodes sandwiching the photoconductive layer and the liquid crystal layer. (Spatial light modulators mentioned below indicate the optically addressed spatial light modulators.) The spatial light modulators are driven by the application of voltage from an outside source to a section between the transparent conductive electrodes. When writing light is irradiated to the photoconductive layer, the electrical resistance of the photoconductive layer changes. Then, voltage applied to the liquid crystal layer varies, thus changing the orientation of liquid crystal molecules. As a result, functions such as the thresholding operation of light, wavelength conversion, incoherent-to-coherent conversion and image storage can be achieved, so that the spatial light modulators are a key device for information processing. When readout light with high intensity is irradiated from the direction opposite the direction of writing light and written information is read by reflection, light amplifying properties are added to the spatial light modulators. Therefore, the modulators can be used as a projection display system, and are expected to be used as general-purpose devices.

Besides the projection display system applying the above-mentioned optically addressed spatial light modulator, the practical projection display systems include the system of projecting with three cathode ray tubes (CRT) having high brightness, and the system of projecting an active matrix liquid crystal light valve with a light source of high brightness.

In the system of projecting with CRT, a color image, images is obtained by displaying image, images on R (red), G (green) and B (blue) CRT having high brightness and 5–7 inches in the diagonal direction and by projecting and converging the images on a screen through three projection lenses. However, since CRT has to display with high brightness so as to provide a bright picture, the resolution and contrast are poor. There is also a problem in that the projection apparatus is heavy.

In the system of projecting an active matrix liquid crystal light valve with a light source of high brightness, image, images are displayed on three (R, G and B) liquid crystal panels or on one liquid crystal panel which includes R, G and B color filters in one body. The image, images are then read by a highly bright light source for backlight such as a metal halide lamp and a halogen lamp, thus projecting the images onto a screen. Compared with the system of projecting with CRT, a projection apparatus can be small and light in this system. However, in order to provide image, images of high resolution, the picture element size of a liquid crystal panel has to be small. As a result, the ratio between the size of a picture element and a shading area (a transistor section for driving a liquid crystal layer) becomes large, thus lowering the aperture ratio of the picture element and darkening image, images.

As described above, there is a trade-off between resolution and brightness. In the projection display systems applying the CRT or the active matrix liquid crystal light valve, both resolution and brightness cannot be accomplished.

In the system of applying the optically addressed spatial light modulator, image, images are input to a photoconductive layer by CRT, and the image, images are read by reflection while a light source of high brightness is irradiated from the side of a liquid crystal layer. The image, images are then projected onto a screen through projection lenses. In this system, the projection apparatus can be kept small and light. Bright image, images of high resolution are also obtained, thus solving the above-mentioned problems of resolution and brightness.

A hydrogenated amorphous silicon (a-Si:H) thin film having high sensitivity with respect to visible light is generally applied as a photoconductive layer constituting a spatial light modulator. As a liquid layer, a ferroelectric liquid crystal which is capable of rapid response is applied in general. The waveform shown in FIG. 17 is proposed as the waveform of an alternating current voltage driving the spatial light modulator (Y. Tanaka et al., Japanese Journal of Applied Physics, 33 (6A), 1994, pp. 3,469–3,477). In period $T_w$ when negative voltage $V_w$ is applied, input image, images are provided to the a-Si:H (photoconductive) layer, and the image, images are written in the ferroelectric liquid crystal layer. In period $T_e$ when positive voltage $V_e$ is applied, the written image, images are erased.

In the conventional driving method of a spatial light modulator mentioned above, half-tone display becomes possible even in the spatial light modulator, applying a bistable ferroelectric liquid crystal, by setting erasing voltage $V_e$ larger than writing voltage $V_w$. Bright output images can also be provided by setting erasing period $T_e$ (off-state (dark state) in the spatial light modulator) shorter than $T_w$ (on-state (bright state) in the modulator).

However, as in the conventional driving method, the liquid crystal layer gradually switches to the on-state by setting $T_w$ long, even if writing light is not irradiated. Thus, the contrast of output image, images in the spatial light modulator radically declines. In addition, since $T_e$ is short, the image, images written in the writing period ($T_w$) remain even after $T_e$ (persistence phenomenon). The sticking phenomenon, which is the persistence phenomenon lasting for more than one minute, can also be found.

The persistence phenomenon or the sticking phenomenon is solved by lengthening cycle so as to make the actual erasing period ($T_e$) longer, by setting the erasing period longer than the writing period under a constant cycle, or by setting the applied voltage ($V_e$) larger in the erasing period ($T_e$). However, if the erasing period is lengthened, the time aperture ratio of the spatial light modulator declines, so that the output image, images become dark. When the applied voltage ($V_e$) in the erasing period is set large, a large portion of the erasing voltage ($V_e$) remains in the liquid crystal layer even in the writing period ($T_w$) after the erasing period. As a result, light of large intensity is required to write in image, images, thus lowering writing sensitivity, the resolution and contrast of written image, images, and the resolution and contrast of output images of the spatial light modulator.

As in the above-mentioned conventional driving method of a spatial light modulator, the trnasmittivity of a liquid crystal layer becomes large with a longer writing period ($T_w$) even when writing light is not irradiated. Thus, the contrast of output image, images declines. This problem is caused by the electrostatic capacity of the liquid crystal layer being equal or smaller than the capacity of the photoconductive layer. In order to solve the problem, the electrostatic capacity of the photoconductive layer can be set much smaller than the capacity of the liquid crystal layer, so that the photoconductive layer has to be five times as thick as the liquid crystal layer. However, the photoconductive layer is thickened, the thickness of the liquid crystal layer becomes uneven due to the warp or deformation of a substrate by the increase in stress of the photoconductive layer. As a result, the uniformity of quality of output image, images radically worsens, and the manufacturing cost of spatial light modulators increases since the time required for forming a photoconductive layer increases.

Cycles can be shortened so as to set the actual writing period shorter or the writing period under constant cycles can be set shorter than the erasing period, thus solving the problems mentioned above. However, writing light with large intensity becomes necessary to switch a liquid crystal layer in a short period, thus lowering the writing sensitivity of the spatial light modulators, the resolution and contrast of written image, images and the resolution and contrast of output image, images.

When a image, images display device providing a two dimensional image, images by scanning from one point to another (such as CRT) is applied as a means of writing image, images in a projection display system applying a spatial light modulator, the frame frequency of CRT and the frequency of the driving waveform of the spatial light modulator resonate. As a result, a "beat", which is the distribution of brightness having a certain spatial cycle, is found on the output image, images of the spatial light modulator. If the beat is clearly found, the picture quality of image, images declines considerably due to the generation of a contrast band on the images. The contrast band shifts as time passes. When the speed of the shifting is high, the band is perceived as flickering, so that looking at image, images becomes difficult. Especially the beat becomes more severer at a spatial light modulator using a photoconductor with rectifing property and a liquid crystal as a ferroelectric liquid crystal which switches according to a polarity of applied voltage because the output image repeats on and off forcibly in response to the frequency of driving AC voltage, the driving frequency of the spatial light modulator and the frame frequency of CRT become easy to resonate each other. At any frequency of driving waveform, the beat is generated even though there is a difference in the level of the beat. The frequency of driving waveform can be set higher than 1 KHz, so that the frequency becomes too high for human eyes to sense the frequency of beat. However, output image, images become dark since the time aperture ratio of the spatial light modulator is reduced.

SUMMARY OF THE INVENTION

It is an object of this invention to solve the above-mentioned conventional problems by providing a driving method for a spatial light modulator which possesses at least a photoconductive layer, a liquid crystal layer and a reflector in a section sandwiched with two transparent insulating substrates having transparent conductive electrodes. The reflector is deposited between the photoconductive layer and the liquid crystal layer. Alternating current voltage (AC), having a waveform of alternately appearing first voltage and second voltage with a polarity opposite to the polarity of the first voltage, is applied to a section between the transparent insulating electrodes. At least one selected from the group consisting of AC cycles, the first voltage in each cycle or the second voltage in each cycle, the first voltage in one cycle of the alternating current voltage or the second voltage in one cycle of AC, and the ratio between the period of the first voltage and the period of the second voltage is not constant.

It is preferable that the first voltage is larger than the second voltage.

It is also preferable that the period of the first voltage is shorter than the period of the second voltage.

It is further preferable that the cycle of the alternating current voltage fluctuates within a range from $T_o/10$ to $10T_o$ where $T_o$ is the median cycle.

It is preferable that the alternating current voltage consists of various cycles with a constant voltage.

It is also preferable that the first voltage in one cycle of the alternating current voltage becomes small as time passes.

It is further preferable that the second voltage in one cycle of the alternating current voltage becomes small as time passes.

It is preferable that the second voltage in one cycle of the alternating current voltage has at least one maximum value or minimum value.

It is also preferable that at least one voltage selected from the group consisting of the first voltage and the second voltage is different in each cycle or in roughly ten cycles.

It is further preferable that at least one voltage selected from the group consisting of the first voltage and the second voltage ranges from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}.

It is preferable that the range of the ratio between the period of the first voltage and the period of the second voltage is from 0.1 to 10.

It is also preferable that the photoconductive layer has rectifying properties.

It is further preferable that the liquid crystal layer includes at least one material selected from the group consisting of ferroelectric liquid crystals and antiferroelectric liquid crystals.

The projection display system of this invention includes at least a spatial light modulator, an AC power supply, a image, images input means, a image, images formation means, a light source, and projection lenses. The spatial light modulator possesses at least a photoconductive layer, a liquid crystal layer, and a of reflector deposited on one plane between the photoconductive layer and the liquid crystal layer. The photoconductive layer, the liquid crystal layer, and the reflector is placed in a section between two transparent insulating substrates having transparent conductive electrodes. The AC power supply is to drive the spatial light modulator and is connected to a section between the transparent conductive electrodes. The image, images input means is to provide image, images to the spatial light modulator. The image, images formation means is to form image, images output from the image, images input means on the photoconductive layer. The light source is to read out image, images output from the spatial light modulator. Alternating current voltage output from the AC power supply has a waveform of alternately appearing first voltage and second voltage having polarity opposite to that of the first voltage. At least one selected from the group consisting of alternating current voltage cycles, the first voltage at each cycle or the second voltage at each cycle, the first voltage in one cycle of the alternating current voltage or the second voltage in one cycle of AC, and a ratio between the period of the first voltage and the period of the second voltage is not constant.

It is preferable that the first voltage is larger than the second voltage.

It is also preferable that the period of the first voltage is shorter than the period of the second voltage.

It is further preferable that the cycle of the alternating current voltage fluctuates within a range from $T_o/10$ to $10T_o$ where $T_o$ is the median cycle.

It is preferable that the alternating current voltage consists of various cycles with a constant voltage.

It is also preferable that the first voltage in one cycle of the alternating current voltage becomes small as time passes.

It is further preferable that the second voltage in one cycle of the alternating current voltage becomes small as time passes.

It is preferable that the second voltage in one cycle of the alternating current voltage has at least one maximum value or minimum value.

It is also preferable that at least one voltage selected from the group consisting of the first voltage and the second voltage is different in each cycle or in roughly ten cycles.

It is further preferable that at least one voltage selected from the group consisting of the first voltage and the second voltage ranges from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}.

It is preferable that the range of the ratio between the period of the first voltage and the period of the second voltage is from 0.1 to 10.

It is also preferable that the image, images input means includes of cathode ray tubes.

When alternating current voltage with inconsistent cycles is applied as a driving waveform, long and short writing periods which are influenced by the length of cycles are provided. In the long writing period, the liquid crystal layer is likely to switch even in a state with no irradiation of writing light, but the intensity of writing light can be reduced. In the short writing period, on the other hand, the switching of the liquid crystal layer in the state with no irradiation of writing light can be prevented. However the intensity of writing light becomes high. Therefore, due to the existence of long and short writing periods and the nonlinear properties of the liquid crystal layer, the merits both of long and short writing periods can be obtained, and the weak points of each period can become unnoticed. As a result, the switching of the liquid crystal with no irradiation of writing light is prevented, and the intensity of writing light can also be weakened, so that output images of high contrast and resolution are provided. In addition, since the cycles are short and long, there are also short and long erasing periods. When the erasing period is short, written image, images cannot be erased completely, thus generating the persistence or sticking. However, the persistence or the sticking is removed immediately in the long erasing period, and human eyes cannot detect the persistence or sticking in the output image, images.

If the first or the second voltage in each cycle is not constant, the following properties are found by applying the first voltage as erasing voltage and the second voltage as writing voltage. When the erasing voltage is large, the persistence and the sticking are prevented. With small erasing voltage, residual erasing voltage left in the liquid crystal layer during the writing period is reduced. The intensity of writing light is reduced when the writing voltage is large. With small writing voltage, the liquid crystal no longer switches naturally by irradiating no writing light in the writing period. As a result, the contrast and resolution of the output image, images improves. From these advantages, image, images of high contrast and resolution whose persistence or sticking is unnoticed are provided.

The properties mentioned below are found by using the first voltage as erasing voltage and the second voltage as writing voltage, when the second voltage in one cycle of alternating current voltage is not constant. In other words, the erasing voltage in each cycle is shifted from high to low as time passes. When the erasing voltage is high, written image, images are completely deleted, thus preventing the persistence and sticking. Just before the writing period, the erasing voltage becomes low, and voltage applied to the liquid crystal layer at the early stages of the writing period becomes small, thus weakening the intensity of writing light. Therefore, image, images of high contrast and resolution whose persistence or sticking is unnoticed are provided. On the other hand, when the writing voltage in each cycle is changed from high to low as time passes, the intensity of writing light can be reduced at the early stage with high voltage. The problem of switching the liquid crystal layer with no irradiation of writing light is solved, by applying small voltage of the later stage and image, images of high resolution and contrast are provided.

If the ratio between the period of the first voltage and the period of the second voltage is not constant, the following properties are found by applying the period of the first voltage as the erasing period and the period of the second voltage as the writing period. When the ratio between the erasing period and the writing period is large, the brightness of output image, images declines. However, the generation of persistence or sticking can be prevented. In addition, the liquid crystal layer no longer switches naturally with no irradiation of writing light. If the ratio is small, the persistence or the sticking is likely to be generated. There is also a problem in that the liquid crystal layer naturally switches with no irradiation of writing light. However, output image, images can be lightened. In other words, due to the existence of large and small ratios between the erasing period and the writing period, the merits of both a large ratio and small ratio are found and the weak points of these ratios become unnoticed. Therefore, output image, images of high contrast and brightness are provided.

If the first voltage is larger than the second voltage, a half-tone display becomes possible even with a spatial light modulator using bistable ferroelectric liquid crystals, by applying the first voltage as the erasing voltage and the second voltage as the writing voltage.

Bright output image, images are provided by applying the period of the first voltage as the erasing period (off-state (dark state) in the spatial light modulator) and the period of the second voltage as the writing period (on-state (light state) in the modulator) when the period of the first voltage is shorter than the period of the second voltage.

The output image, images of stable brightness are also provided if the cycle of alternating current voltage ranges from $T_o/10$ to $10T_o$ where $T_o$ is the median cycle.

When the second voltage in one cycle of alternating current voltage has at least one maximum or minimum value, sensitivity to the writing light of the spatial light modulator varies with respect to time, so that the brightness distribution of output image, images generated from the brightness distributions of a writing and reading optical system and a writing optical system become small.

At least one voltage selected from the group consisting of the first voltage and the second voltage ranges from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}, so that the output image, images of stable brightness are provided.

When the range of the ratio between the period of the first voltage and the period of the second voltage is from 0.1 to 10, output image, images of stable brightness are provided by applying the period of the first voltage as the erasing period and the period of the second voltage as the writing period.

Photocarriers are efficiently generated by the irradiation of writing light when the photoconductive layer has rectifying properties, so that the photocarriers are efficiently transported to the liquid crystal layer.

If the liquid crystal layer consists of at least one material selected from the group consisting of ferroelectric liquid crystals and antiferroelectric liquid crystals, the liquid crystal layer can be thinned. Thus, the photoconductive layer can also be thin. The ferroelectric liquid crystals and the antiferroelectric liquid crystals are capable of quick response and are useful since they have memory properties. When the ferroelectric liquid crystals, the antiferroelectric liquid crystals, or a mixture of the ferroelectric and antiferroelectric liquid crystals are used for the liquid crystal layer, image, images written in the layer can be erased by the application of forward bias.

DETAILED DESCRIPTION OF THE INVENTION

This invention will be described by referring to the following illustrative examples and attached figures.

Figure 1:
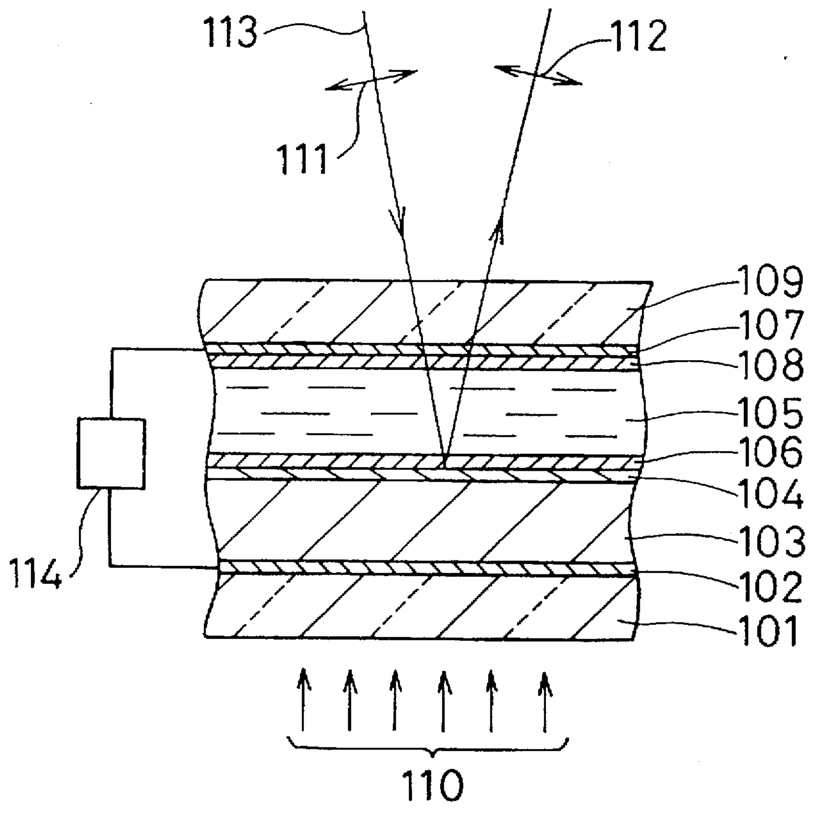
FIG. 1 is a cross-sectional view of a spatial light modulator applied to one embodiment of the driving method of the invention.

FIG. 1 is a cross-sectional view of the spatial light modulator of one embodiment of the invention. As shown in FIG. 1, a transparent conductive electrode 102 (for example, ITO (indium-tin oxide), conductive oxide such as ZnO and $SnO_2$, or a semi-transparent metal thin film such as Cr, Au, Pt and Pd) and a photoconductive layer 103 made of an amorphous semiconductor are sequentially formed on a transparent insulating substrate 101 (for instance, a heat resistant glass substrate, fused silica substrate or sapphire substrate). On photoconductive layer 103, a reflector 104 and an alignment film 106 for aligning liquid crystal layer 105 are laminated, thus preparing a first substrate. A transparent conductive electrode 107 (e.g., ITO (indium-tin oxide), conductive oxide such as ZnO and $SnO_2$, or a semi-transparent metal thin film such as Cr, Au, Pt and Pd) and an alignment film 108 for aligning a liquid crystal layer 105 are sequentially formed on a transparent insulating substrate 109 (for example, a heat resistant glass substrate, fused silica substrate, or sapphire substrate), thereby preparing a second substrate. Liquid crystal layer 105 is sandwiched between the first and second substrates.

The spatial light modulator is driven by applying alternating current voltage from an AC power supply 114 which is connected to a section between transparent conductive electrodes 102 and 107. As the alternating current voltage, voltage having a waveform shown in FIG. 4, for example, is applied. In the figure, the period of applying negative voltage ($V_w$) is a writing period ($T_w$) for writing image, images in the spatial light modulator; the period of applying positive voltage ($V_e$) is an erasing period ($T_e$) for erasing written image, images.

When writing light 110 is irradiated from the side of transparent insulating substrate 101 to photoconductive layer 103 during the application of negative voltage ($V_w$) to the spatial light modulator, the electric resistance of photoconductive layer 103 at a section where writing light 110 is irradiated changes. Thus, the voltage across corresponding of liquid crystal layer 105 increases, changing the orientation of liquid crystal molecules. The orientation of the liquid crystal molecules is observed as reflecting light from reflector 104 by an optical system of a polarizer 111 and an analyzer 112 while readout light 113 is irradiated from the side opposite to the direction of writing light 110 (side of transparent conductive electrode 109). Instead of the optical system of polarizer 111 and analizer 112, one polarizing beam splitter can also be applied.

Figure 4:
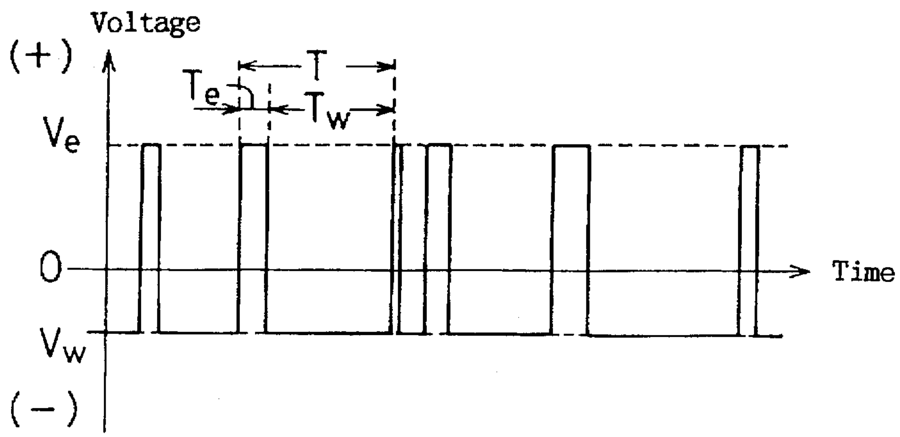
FIG. 4 shows an alternating current voltage waveform applied to one embodiment of the driving method of the invention.

By referring to FIGS. 4–16, specific examples of alternating current voltage waveform applied to the spatial light modulator from the AC power supply are explained below. FIG. 4 shows an alternating current voltage waveform in which the frequency 1/T (cycle $T=T_e+T_w$) is changed at each cycle. (Erasing voltage $V_e$, writing voltage $V_w$, and the ratio ($T_e/T_w$:duration ratio) between erasing period $T_e$ and writing period $T_w$ are set constant.) Flickering is not detected by human eyes at the upper limit of the fluctuation range of cycle T; the liquid crystal layer can respond at the lower limit of the range. The lower limit depends on the material of liquid crystals and the thickness of the liquid crystal layer. However, the specific range of cycle T (frequency 1/T) is preferably from 1μ sec to 1 sec (from 1 Hz to 1 MHz). It is more preferable that the range is from 10μ sec to 0.1 sec (from 10 Hz to 100 kHz), and is further preferable that the range is from 100μ sec to 0.33 sec (from 30 Hz to 10 kHz).

By applying an alternating current voltage waveform having inconsistent cycles T, long and short writing periods $T_w$ are generated due to the length of cycles T. When writing period $T_w$ is long, the liquid crystal layer is likely to switch even with no irradiation of writing light. However, on the other hand, the intensity of writing light is weakened. With a short writing period $T_w$, the intensity of writing light becomes large, but the switching of the liquid crystal layer with no irradiation of writing light can be prevented. Thus, with the existence of long and short writing periods $T_w$ and the nonlinear properties of the liquid crystal layer, the merits of both long and short writing periods $T_w$ are found, and negative aspects of each period become unnoticed. As a result, the switching of the liquid crystal layer with no irradiation of writing light is prevented, and the intensity of writing light can be kept small, thus providing output image, images of high contrast and resolution. Because of the long and short cycles T, there are short and long erasing periods $T_e$. When erasing period $T_e$ is short, the deletion of written image, images is unsatisfactory. Thus, the persistence or sticking is likely to occur. However, in long erasing period $T_e$, the persistence or sticking is removed, so that human eyes cannot detect those phenomena. Due to the existence of short and long erasing periods $T_e$ and the nonlinear of liquid crystal layer, the merits of each short aud long erasing period are obtained, and the negative aspects of the periods become unnoticed. As a result, output image, images of high contrast and resolution with no preceived persistence and sticking are obtained.

If the frequencies are changed in a wide range at each cycle and the spatial light modulator is used as a display, inconsistency is found in the brightness of image, images. When cycle T is changed from $T_o/10$ to $10T_o$ with respect to center cycle $T_o$, image, images of stable brightness are provided. The specific range of $T_o$ is from 200μ sec to 20 m sec. Writing period Tw is longer than erasing period $T_e$ to obtain a bright image when the module is applied sa a display. In other words, the duration ratio ($T_e/T_w$) is preferably less than 1. However, when the module is applied as an optical processor, a hologram system and the like, the duration ratio is preferably from 0.01 to 2, or more preferably from 0.05 to 1.

Figure 5:
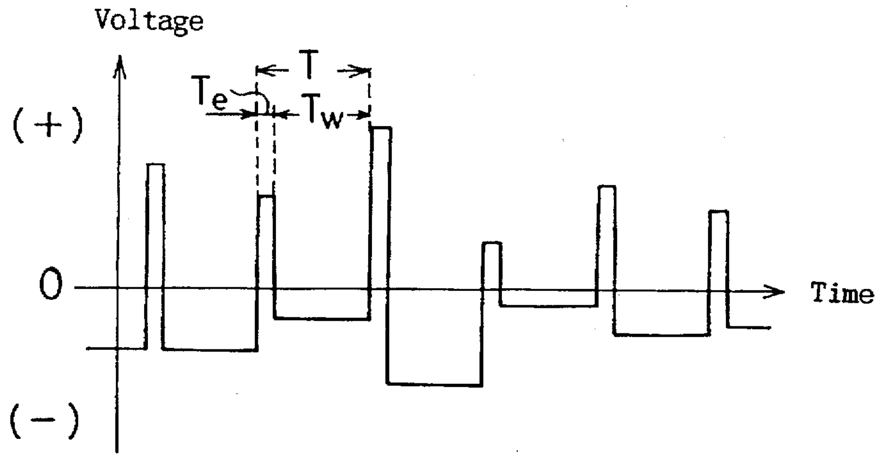
FIG. 5 shows another alternating current voltage waveform applied to one embodiment of the driving method of the invention.
Figure 6A:
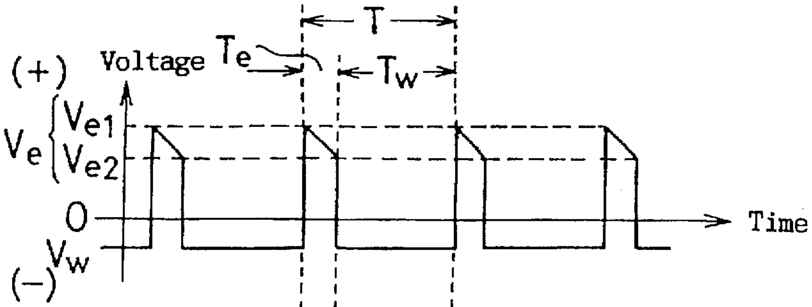
FIG. 6A shows an alternating current voltage waveform applied to one embodiment of the driving method of the invention.
Figure 6B:
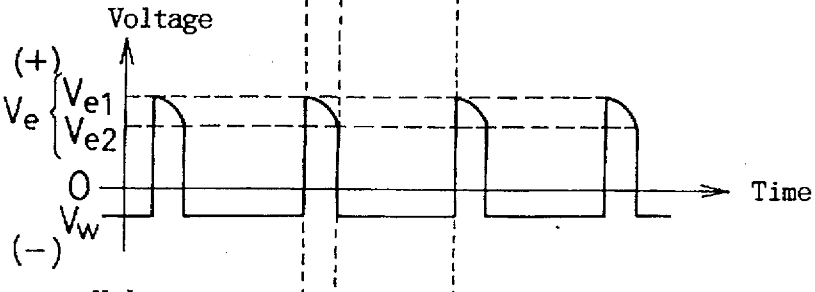
FIG. 6B shows an alternating current voltage waveform of the invention.
Figure 6C:
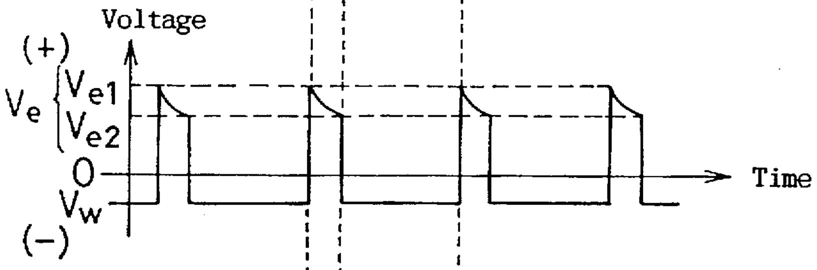
FIG. 6C shows an alternating current voltage waveform of the invention.
Figure 6D:
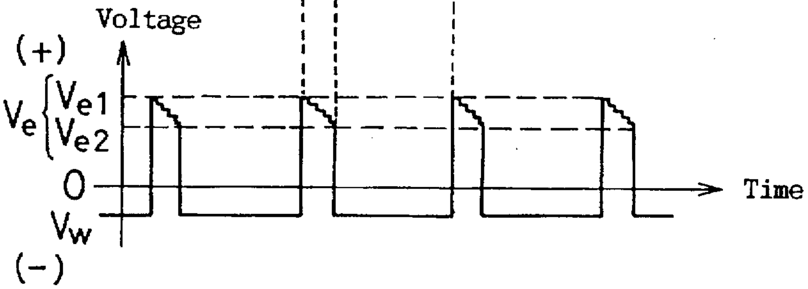
FIG. 6D shows an alternating current voltage waveform of the invention.
Figure 7A:
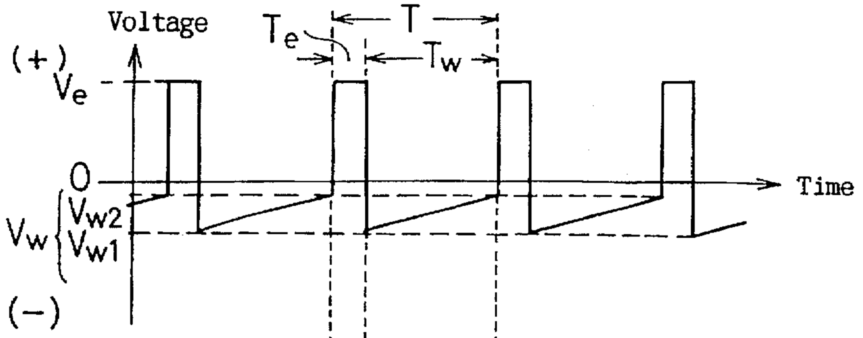
FIG. 7A shows another alternating current voltage waveform applied to one embodiment of the driving method of the invention.
Figure 7B:
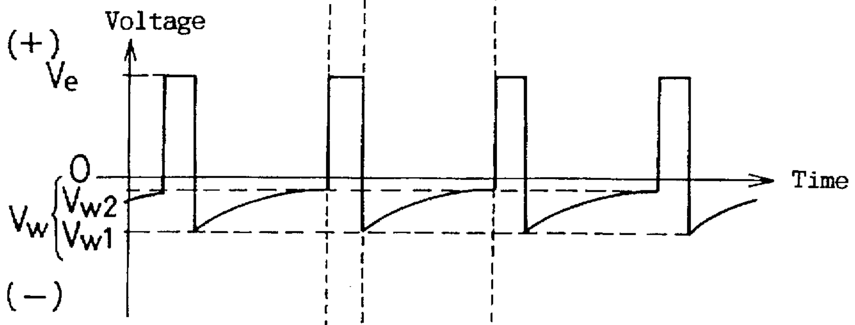
FIG. 7B shows an alternating current voltage waveform of the invention.
Figure 7C:
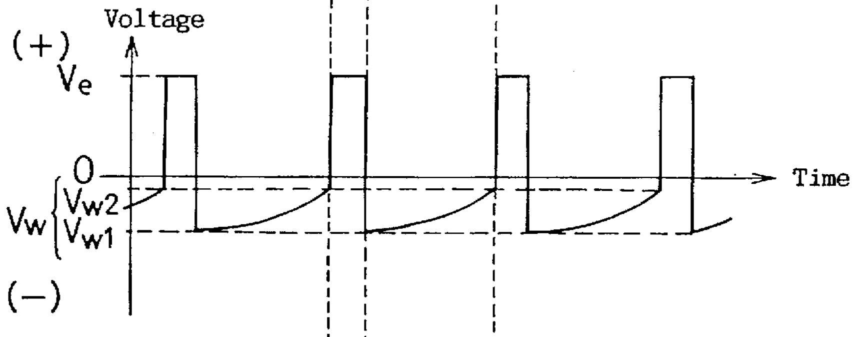
FIG. 7C shows an alternating current voltage waveform of the invention.
Figure 7D:
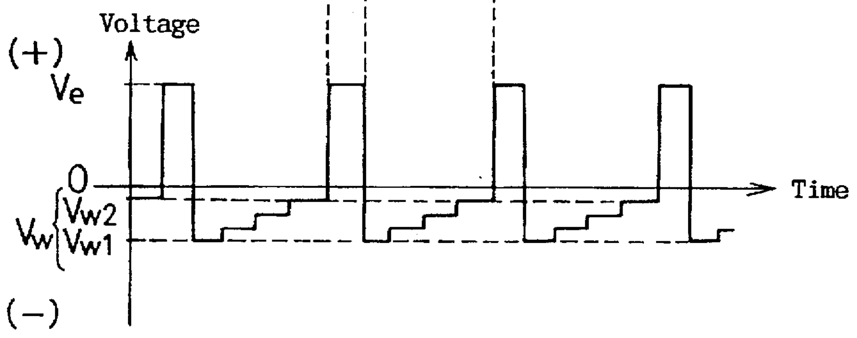
FIG. 7D shows an alternating current voltage waveform of the invention.
Figure 8A:
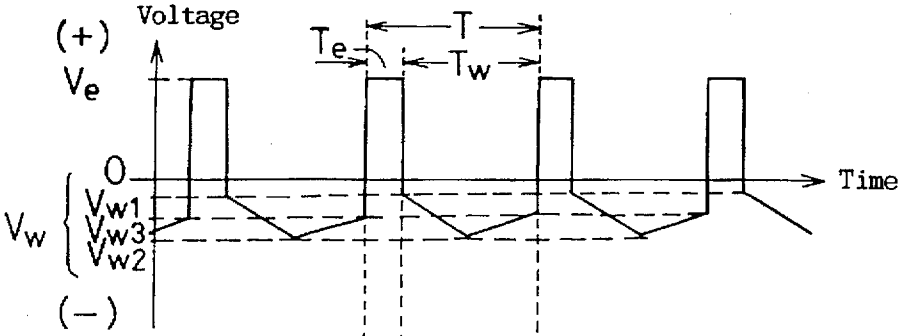
FIG. 8A shows another alternating current voltage waveform applied to one embodiment of the driving method of the invention.
Figure 8B:
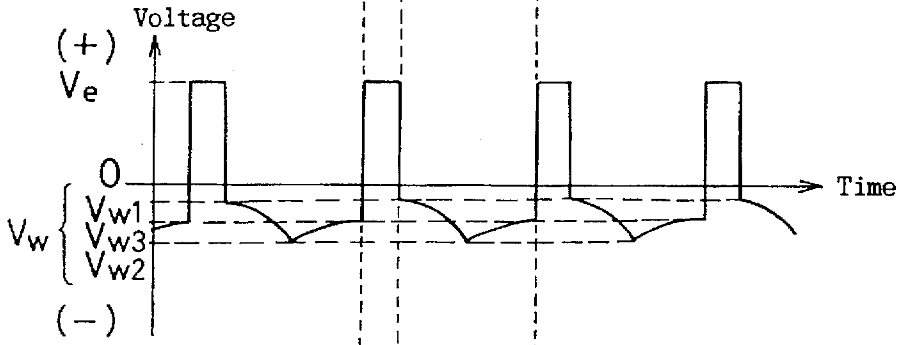
FIG. 8B shows an alternating current voltage waveform of the invention.
Figure 8C:
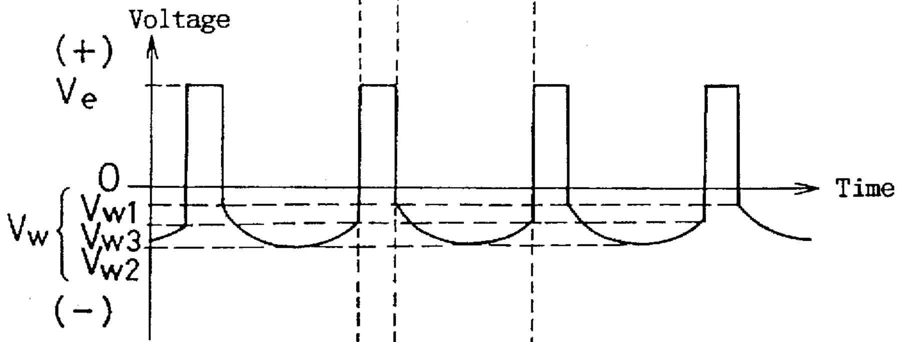
FIG. 8C shows an alternating current voltage waveform of the invention.
Figure 8D:
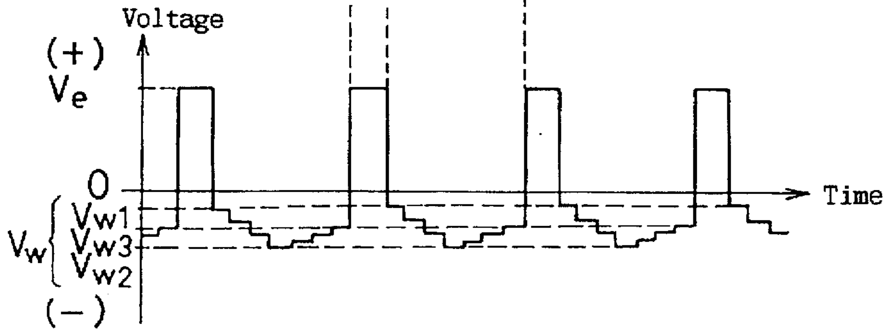
FIG. 8D shows an alternating current voltage waveform of the invention.
Figure 9A:
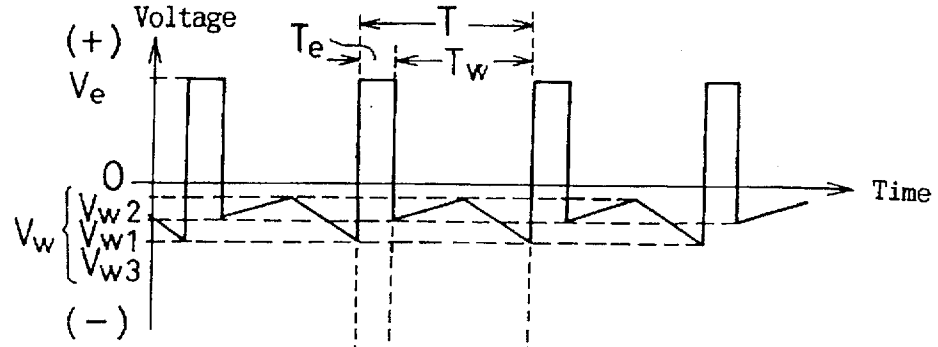
FIG. 9A shows another alternating current voltage waveform applied to one embodiment of the driving method of the invention.
Figure 9B:
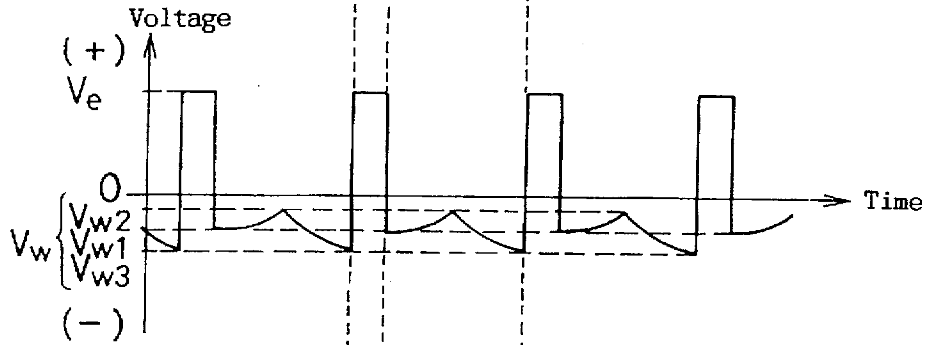
FIG. 9B shows an alternating current voltage waveform of the invention.
Figure 9C:
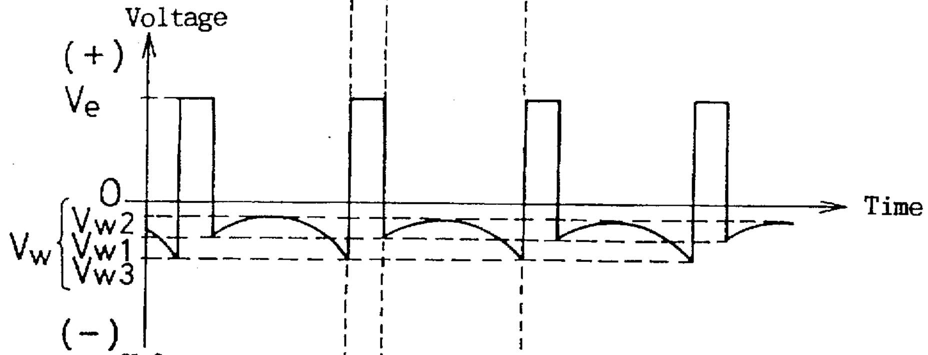
FIG. 9C shows an alternating current voltage waveform of the invention.
Figure 9D:
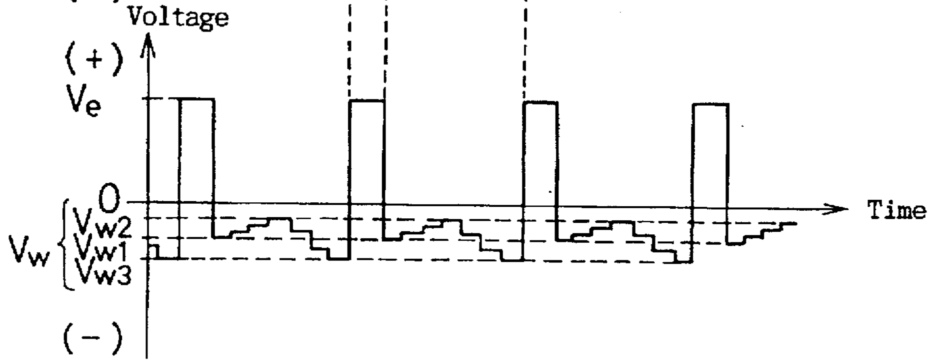
FIG. 9D shows an alternating current voltage waveform of the invention.

FIG. 5 shows an alternating current voltage waveform in which cycle T and the duration ratio ($T_e/T_w$) are set constant and erasing voltage ($V_e$) and writing voltage ($V_w$) are randomly changed. There is no change in polarity even though the erasing voltage and the writing voltage become zero.

The following properties are found when an alternating current voltage waveform of randomly changing erasing voltage ($V_e$) and writing voltage ($V_w$) is applied as a driving waveform. With large erasing voltage ($V_e$), the persistence and sticking are prevented. When erasing voltage $V_e$ is small, erasing voltage $V_e$ remaining in the liquid crystal layer in writing period ($T_w$) can be reduced. With large writing voltage $V_w$, the intensity of writing light is reduced. The natural switching of liquid crystal layer with no irradiation of writing light is prevented when writing voltage $V_w$ is small, thus improving the contrast of output image, images. Therefore, with the application of the alternating current voltage waveform of randomly changing erasing voltage and writing voltage as a driving waveform, the conventional problems generated by the increase or decrease in the writing voltage and the erasing voltage are solved. Picture images of high contrast and resolution with no persistence and sticking are provided.

FIGS. 6A, 6B, 6C and 6D show an alternating current voltage waveform in which only erasing voltage $V_e$ is changed at each cycle with the passage of time, and cycles T, duration ratio ($T_e/T_w$) and writing voltage $V_w$ are kept constant. In the figures, four patterns shifting from high erasing voltage $V_{e1}$ to low voltage $V_{e2}$ are shown. The patterns of the change in erasing voltage $V_e$ are not limited to these examples. Thus, when this alternating current voltage waveform is applied as a driving waveform, written image, images are completely erased at the early stage of high voltage $V_{e1}$. As a result, the persistence or sticking is prevented. Just before writing period $T_w$, the erasing voltage becomes low voltage $V_{e2}$, and voltage across to the liquid crystal layer in the early stage of writing period ($T_w$) becomes small. Therefore, the intensity of writing light becomes small, providing image, images of high contrast and resolution with no persistence and sticking.

FIGS. 7A, 7B, 7C and 7D show an alternating current voltage waveform in which only writing voltage $V_w$ is changed at each cycle with the passage of time, and cycles T, duration ratio ($T_e/T_w$) and erasing voltage $V_e$ are kept constant. In the figures, four patterns shifting from high writing voltage $V_{w1}$ to low voltage $V_{w2}$ are shown. The patterns of the change in writing voltage $V_w$ are not limited to these examples. Thus, when this alternating current voltage waveform is applied as a driving waveform, the intensity of writing light is reduced at the early stage of high voltage $V_{w1}$. With low voltage $V_{w2}$, the switching of liquid crystal layer with no irradiation of writing light is prevented. Picture images of high resolution and contrast can be easily provided.

FIGS. 8A, 8B, 8C and 8D show an alternating current voltage waveform in which only writing voltage $V_w$ is changed at each cycle with the passage of time, and cycles T, duration ratio ($T_e/T_w$) and erasing voltage $V_e$ are kept constant. Writing voltage $V_w$ shifts from the initial value ($V_{w1}$) to maximum value ($V_{w2}$), and then to $V_{w3}$. In the figures, four patterns shift from the initial value to the maximum value and then to $V_{w3}$. The patterns of the change in writing voltage $V_w$ are not limited to these examples. As long as the time of reaching the maximum value ($V_{w2}$) is within writing period $T_w$, the pattern is not particulary limited. The change in writing voltage $V_w$ fluctuates the sensitivity of the spatial light modulator with respect to writing light 110 as time passes. In other words, the spatial light modulator has the highest sensitivity at maximum value $V_{w2}$, and the output image, images become the brightest with respect to writing light having a certain intensity. Therefore, the brightness distribution of output image, images generated by the brightness distributions of a writing optical system and a reading optical system is minimized when this alternating voltage current waveform is applied as a driving waveform. Similarly, as shown in FIGS. 9A, 9B, 9C and 9D, an alternating current voltage waveform of shifting writing voltage $V_w$ from initial voltage ($V_{w1}$) to minimum value ($V_{w2}$) and then to $V_{w3}$ along with the brightness distribution of output image, images can be applied as a driving waveform.

Figure 10A:
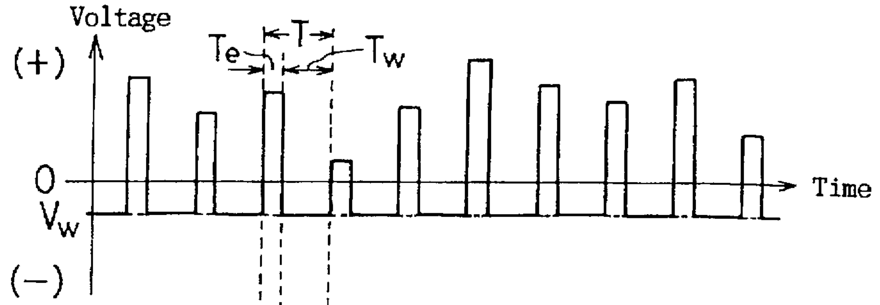
FIG. 10A shows another alternating current voltage waveform applied to one embodiment of the driving method of the invention.
Figure 10B:
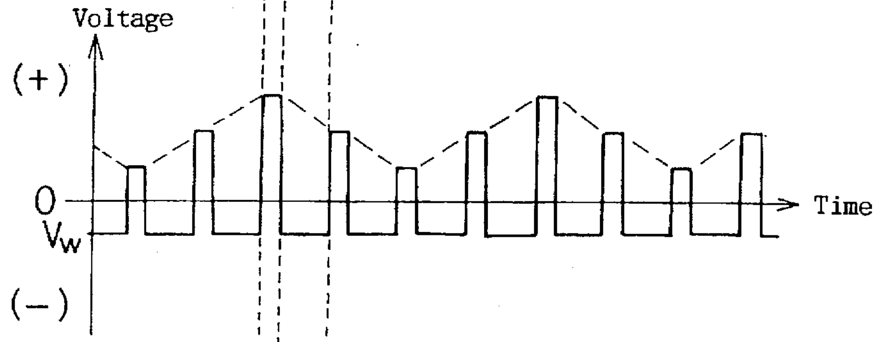
FIG. 10B shows an alternating current voltage waveform of the invention.

FIGS. 10A and 10B show an alternating current voltage waveform with changing erasing voltage $V_e$ at each cycle while cycles T, duration ratio ($T_e/T_w$) and writing voltage ($V_w$) are set constant. In FIG. 10A, the change in erasing voltage $V_e$ is irregular. However, in FIG. 10B, erasing voltage $V_e$ varies regularly. When this alternating current voltage waveform is applied as a driving waveform, the properties as described below are found. With a large erasing voltage $V_e$, the persistence or sticking is prevented. When erasing voltage $V_e$ is small, the erasing voltage remaining in the liquid crystal layer in writing period $T_w$ is reduced. Thus, the writing sensitity does not decline, and bright image, images with no persistence and sticking are obtained.

Figure 10C:
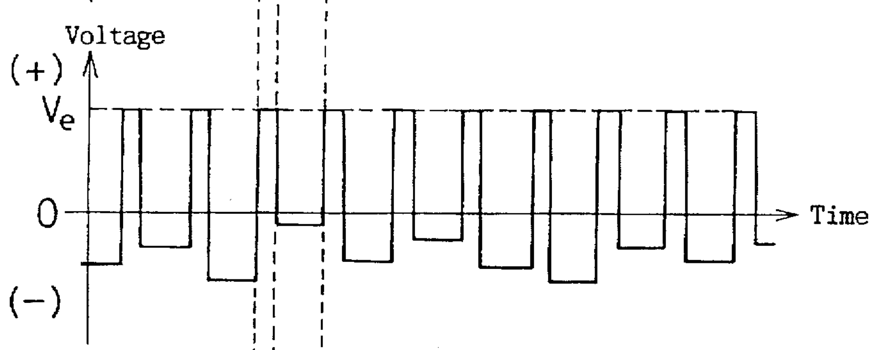
FIG. 10C shows an alternating current voltage waveform of the invention.
Figure 10D:
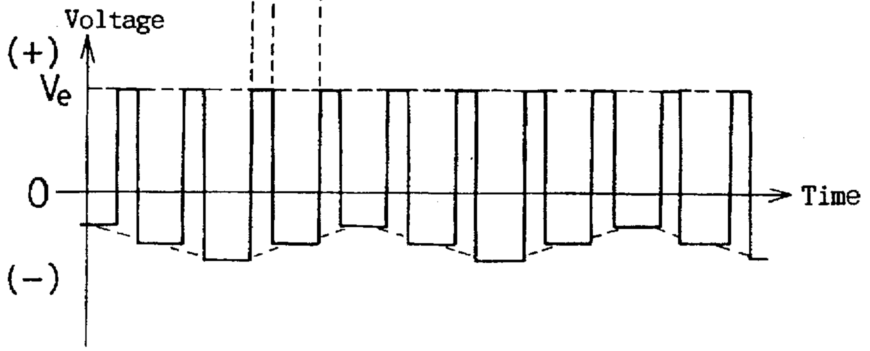
FIG. 10D shows an alternating current voltage waveform of the invention.

FIGS. 10C and 10D show an alternating current voltage waveform with changing writing voltage $V_w$ at each cycle while cycles T, duration ratio ($T_e/T_w$) and erasing voltage ($V_e$) are set constant. In FIG. 10C, the change in writing voltage $V_w$ is irregular. However, in FIG. 10D, the writing voltage varies regularly. When this alternating current voltage waveform is applied as a driving waveform, the following properties are found. When the writing voltage is high, the intensity of writing light is lessened. With low writing voltage $V_w$, the natural switching of the liquid crystal layer with no irradiation of writing light is prevented, so that bright image, images of high resolution and contrast are obtained.

Figure 11A:
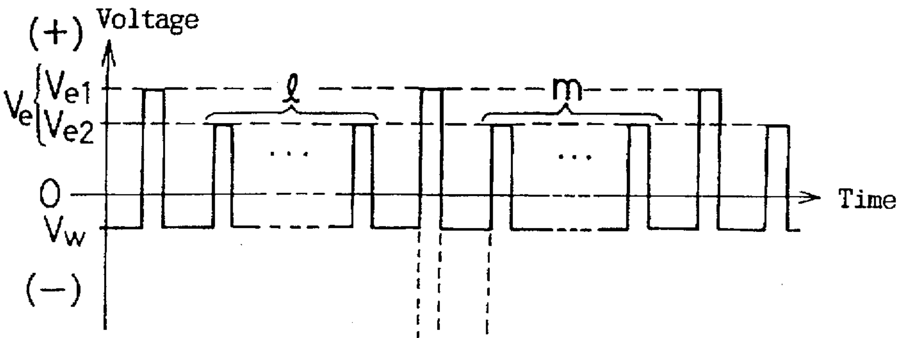
FIG. 11A shows another alternating current voltage waveform applied to one embodiment of the driving method of the invention.
Figure 11B:
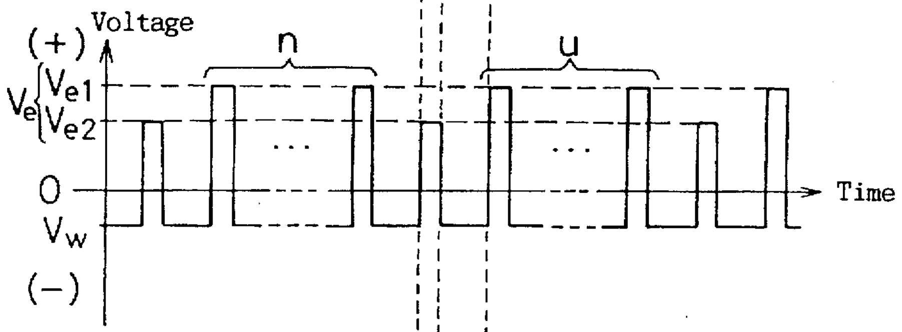
FIG. 11B shows an alternating current voltage waveform of the invention.
Figure 11C:
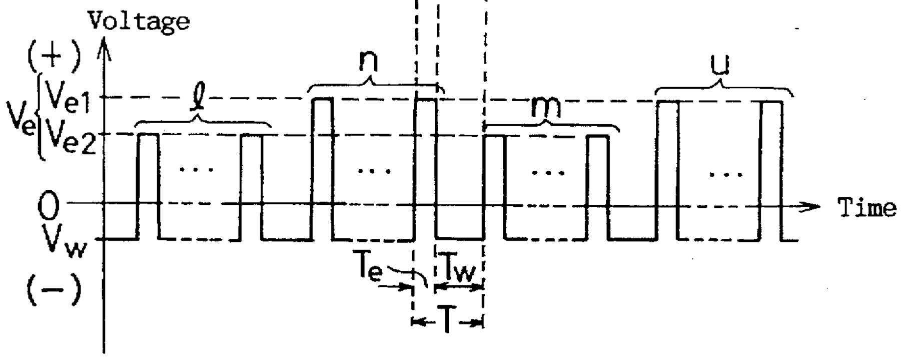
FIG. 11C shows an alternating current voltage waveform of the invention.

FIGS. 11A, 11B and 11C show an alternating current voltage waveform in which erasing voltage $V_e$ changes regularly while cycles T, duration ratio ($T_e/T_w$) and writing voltage ($V_w$) are kept constant. In FIG. 11A, cycles having low erasing voltage ($V_{e2}$) are repeated (l) times after one cycle having high erasing voltage ($V_{e1}$). Furthermore, after one cycle of high erasing voltage ($V_{e1}$), cycles having low erasing voltage ($V_{e2}$) are repeated (m) times. In FIG. 11B, cycles having high erasing voltage ($V_{e1}$) are repeated (n) times after one cycle of low erasing voltage ($V_{e2}$); cycles of high erasing voltage ($V_{e1}$) are repeated (u) times after one cycle having low erasing voltage ($V_{e2}$). In FIG. 11C, cycles having high erasing voltage ($V_{e1}$) are repeated (n) times after cycles having low erasing voltage ($V_{e2}$) are repeated (l) times ; cycles having high erasing voltage ($V_{e1}$) are repeated (u) times after cycles having low erasing voltage ($V_{e2}$) are repeated (m) times. When (l), (m), (n) and (u)$\geqq$1, (l) can be either equal or unequal to (m), and (n) can be equal or unequal to (u). Therefore, when erasing voltage ($V_e$) is large, the persistence and sticking are prevented. With small erasing voltage ($V_e$), residual erasing voltage in the liquid crystal layer during the writing period is reduced. As a result, output image, images of high contrast and resolution with no persistence and sticking are obtained.

Figure 12A:
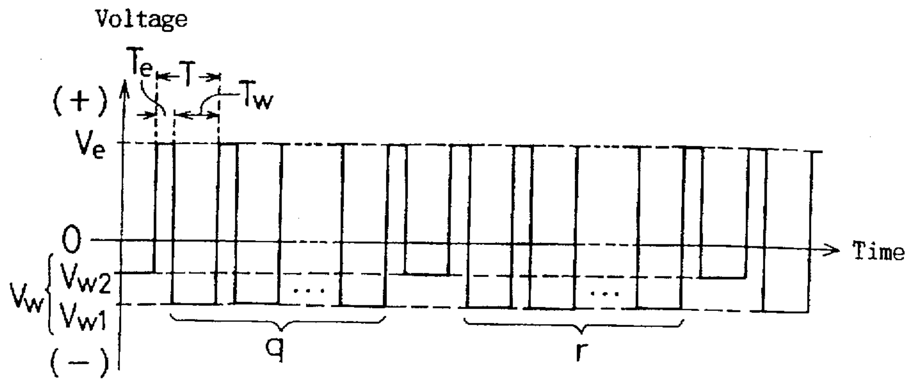
FIG. 12A shows another alternating current voltage waveform applied to one embodiment of the driving method of the invention.
Figure 12B:
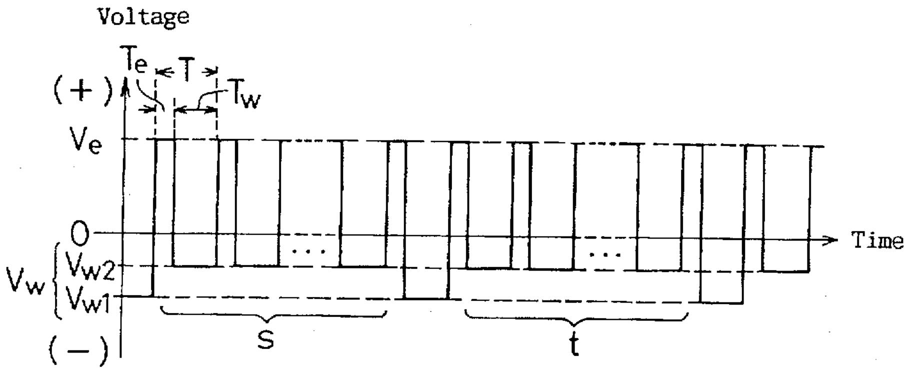
FIG. 12B shows an alternating current voltage waveform of the invention.
Figure 12C:
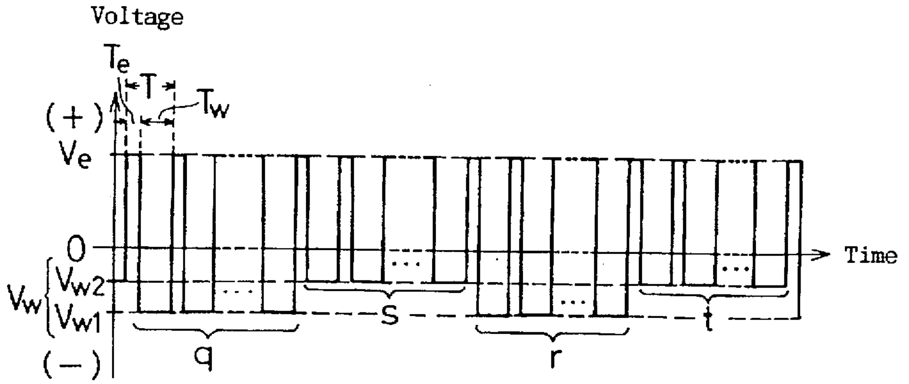
FIG. 12C shows an alternating current voltage waveform of the invention.

FIGS. 12A, 12B and 12C show an alternating current voltage waveform with regularly changing writing voltage $V_w$ while cycles T, duration ratio ($T_e/T_w$) and erasing voltage $V_e$ are kept constant. In FIG. 12A, cycles of high writing voltage $V_{w1}$ are repeated (q) times after one cycle having low writing voltage $V_{w2}$; cycles of high writing voltage $V_{w1}$ are repeated (r) times after one cycle having low writing $V_{w2}$. In FIG. 12B, cycles of low writing voltage $V_{w2}$ are repeated (s) times after one cycle having high erasing voltage $V_{w1}$; cycles of low writing voltage $V_{w2}$ are repeated (t) times after one cycle having high erasing voltage $V_{w1}$. In FIG. 12C, cycles of low writing voltage $V_{w2}$ are repeated (s) times after cycles having high writing voltage $V_{w1}$ are repeated (q) times, cycles having high writing voltage are repeated (r) times, and cycles of low writing voltage $V_{w2}$ are repeated (t) times. When (q), (r), (s) and (t) are one or larger than one, (q) is equal or unequal to (r). In addition, (s) is equal or unequal to (t). Therefore, when the writing voltage is large, the intensity of writing light can be reduced. The natural switching of the liquid crystal layer with no irradiation of writing light is prevented when the writing voltage is small. As a result, bright image, images of high resolution and contrast are provided.

In FIGS. 11A, 11B and 11C, and in FIGS. 12A, 12B and 12C, the erasing voltage or the writing voltage has two types of values. However, the erasing voltage or the writing voltage may have three or more types of values. In FIGS. 11A, 11B, 11C and 11D, low erasing voltage ($V_{e2}$) and high erasing voltage ($V_{e1}$) have two types of cycle numbers. (The cycle numbers of the low erasing voltage are (l) times and (m) times. The cycle numbers of the high erasing voltage are (n) times and (u) times.) However, the low erasing voltage and the high erasing voltage can have three or more types of cycle numbers. In FIGS. 12A, 12B, 12C and 12D, high writing voltage $V_{w1}$ and low writing voltage $V_{w2}$ have two types of cycle numbers. (The cycle numbers of the high writing voltage are (q) times and (r) times. The cycle numbers of the low writing voltage are (s) times and (t) times.) However, the high writing voltage and the low writing voltage can have three or more types of cycle numbers.

If erasing voltage $V_e$ or writing voltage $V_w$ in the alternating current voltage waveforms shown in FIGS. 6–12 is changed in a wide range, the brightness of image, images become inconsistent. In order to obtain the image, images of stables brightness, the erasing voltage or the writing voltage is preferably changed from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}.

Figures 13A, 13B, 13C:
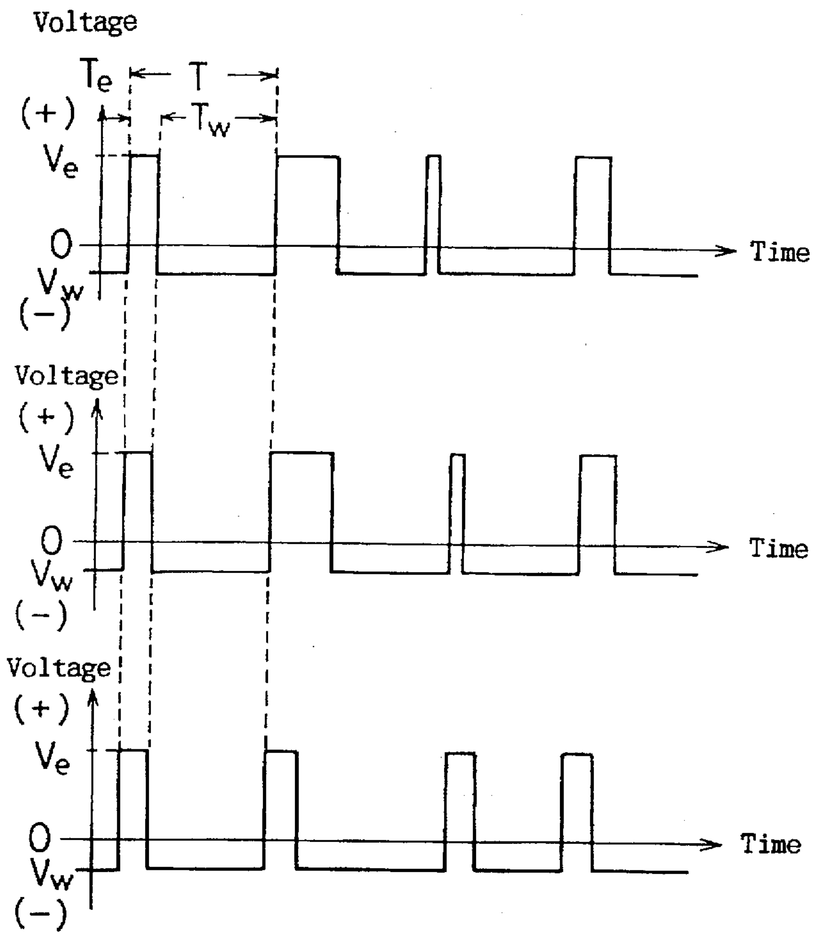
FIG. 13A shows another alternating current voltage waveform applied to one embodiment of the driving method of the invention.
FIG. 13B shows an alternating current voltage waveform of the invention.
FIG. 13C shows an alternating current voltage waveform of the invention.

FIG. 13A shows an alternating current voltage waveform in which only the duration ratio ($T_e/T_w$) changes at each cycle while cycles T, erasing voltage $V_e$ and writing voltage $V_w$ are kept constant. FIG. 13B shows an alternating current voltage waveform changing only duration ratio ($T_e/T_w$) at each cycle while writing period $T_w$, erasing voltage V and writing voltage $V_w$ are kept constant. FIG. 13C shows an alternating current voltage waveform varying only writing period $T_w$ at each cycle so as to change the duration ratio ($T_e/T_w$) while erasing $T_e$, erasing voltage $V_e$ and writing voltage $V_w$ are kept constant. When the duration ratio is large, the brightness of output image, images declines. However, the generation of persistence or sticking, and the natural switching of liquid crystal layer with no irradiation of writing light are prevented. When the duration ratio is small, the persistence or sticking is unlikely to occur. Even though the natural switching of the liquid crystal layer with no irradiation of writing light is likely to occur, output image, images can be brightened. Due to the existence of large and small duration ratios and the nonlinear properties of the liquid crystal layer, the merits of the large and small duration ratios are found, and the negative aspects of the duration ratios become unnoticed. As a result, the bright output image, images of high contrast and resolution with no persistence and sticking are obtained.

If the duration ratios at each cycle of the alternating current voltage waveform of FIGS. 13A, 13B, 13C and 13D are changed in a wide range and the spatial light modulator is applied as a display, the brightness of image, images becomes inconsistent. In order to provide image, images of stable brightness from the spatial light modulator applied as a display, the duration ratios ($T_e/T_w$) are preferably in the range from 0.1 to 10.

Figure 14A:
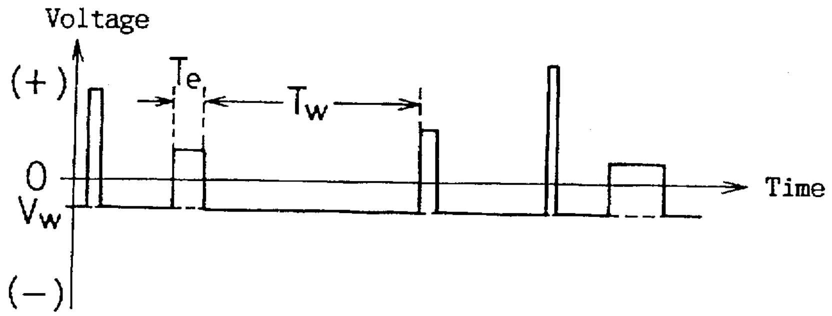
FIG. 14A shows another alternating current voltage waveform applied to one embodiment of the driving method of the invention.
Figure 14B:
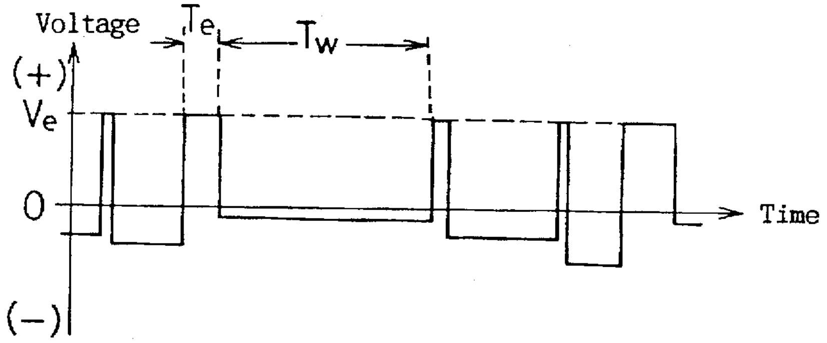
FIG. 14B shows an alternating current voltage waveform of the invention.

FIG. 14A shows an alternating current voltage waveform in which frequency 1/T and erasing voltage $V_e$ change at each cycle while duration ratios ($T_e/T_w$) and writing voltage ($V_w$) are set constant. FIG. 14B shows an alternating current voltage waveform in which frequency 1/T and writing voltage $V_w$ change at each cycle while duration ratios ($T_e/T_w$) and erasing voltage ($V_e$) are set constant. The properties provided from the application of the alternating current voltage waveform of changing frequency 1/T and erasing voltage $V_e$ at each cycle as a driving waveform are as follows. In other words, with a short erasing period $T_e$, the deletion of written image, images is not sufficient, and the persistence or sticking is likely to occur. However, the persistence or sticking is removed in the long erasing period, so that human eyes cannot detect those phenomena. Due to the existence of short and long erasing periods and the nonlinear properties of the liquid crystal layer, the merits of the short and long erasing periods are found, and the negative aspects of the periods are unnoticed. As a result, output image, images of high contrast and resolution with no persistence and sticking are provided. The effects mentioned below are found when the alternating voltage waveform with changing frequency 1/T and writing voltage $V_w$ at each cycle is applied as a driving waveform. With long writing period $T_w$, the liquid crystal layer is likely to switch with no irradiation of writing light, but the intensity of writing light can be reduced. When writing period $T_w$ is short, the intensity of writing light becomes large. However, the switch of the liquid crystal layer with no irradiation of writing light is prevented. Due to the existence of long and short writing periods and the nonlinear properties of the liquid crystal layer, the benefits of the long and short writing periods are found, and the negative aspects of the periods are unnoticed. As a result, the switching of the liquid crystal layer with no irradiation of writing light is prevented, and output image, images of high contrast and resolution are provided.

Figure 15:
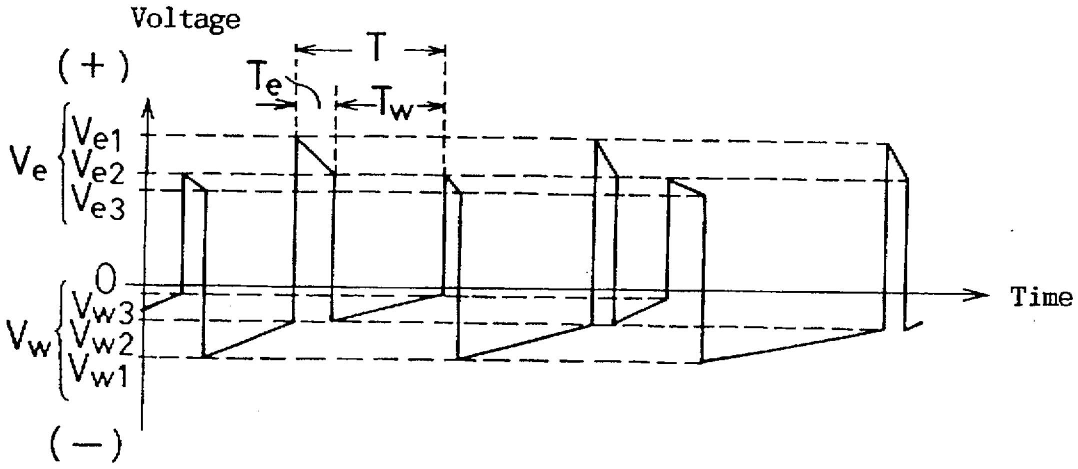
FIG. 15 shows another alternating current voltage waveform applied to one embodiment of the driving method of the invention.

In FIG. 15, erasing voltage $V_e$ and writing voltage $V_w$ in each cycle vary at each cycle as time passes. The figure shows an alternating current voltage waveform with changing frequency 1/T and duration ratios $T_e/T_w$ at each cycle. Since this alternating current voltage waveform has the properties of the alternating current voltage waveforms shown in FIGS. 4, 6, 7 and 13, bright image, images of high resolution and contrast with no persiarance and sticking are obtained.

In FIG. 15, there are two types of change in erasing voltage $V_e$ (from $V_{e1}$ to $V_{e2}$ and from $V_{e2}$ to $V_{e3}$). The change in the erasing voltage is not limited to two types, and can be one type or three or more types. The types of the change in erasing voltage $V_e$ may be the same as or different from the types of change in writing voltage $V_w$.

Figure 16A:
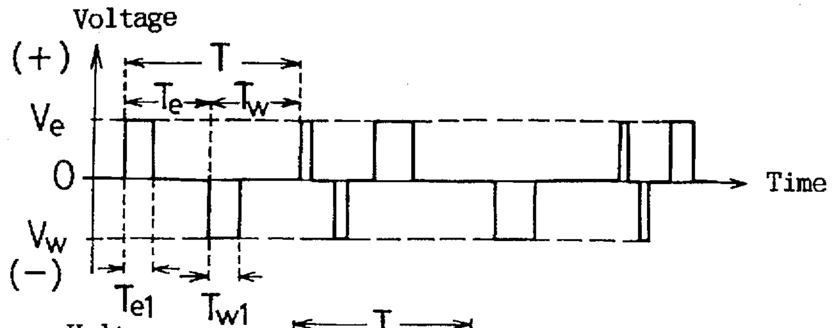
FIG. 16A shows another alternating current voltage waveform applied to one embodiment of the driving method of the invention.
Figure 16B:
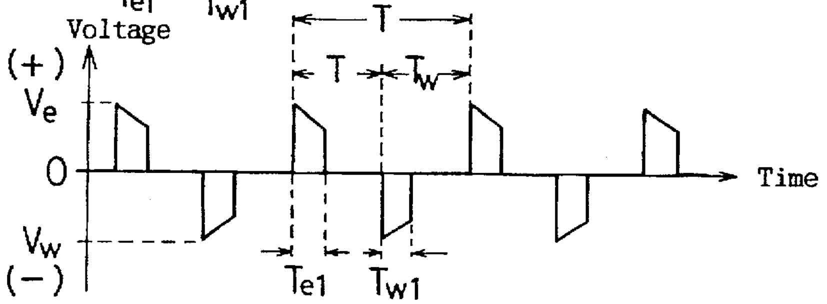
FIG. 16B shows an alternating current voltage waveform of the invention.
Figure 16C:
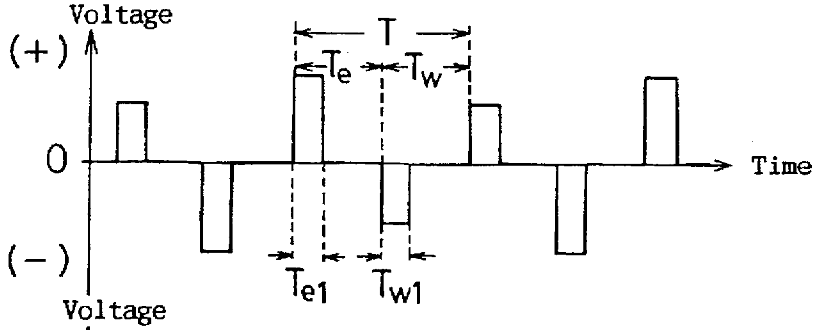
FIG. 16C shows an alternating current voltage waveform of the invention.
Figure 16D:
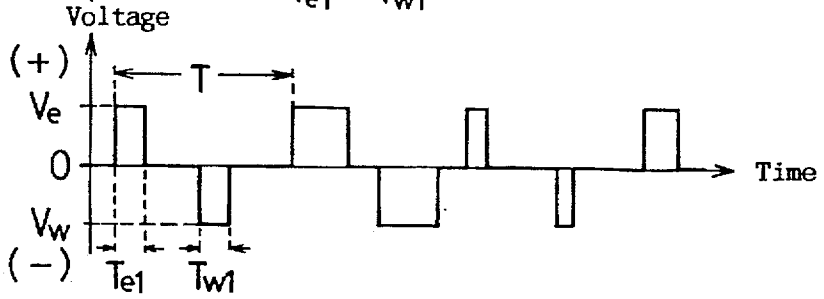
FIG. 16D shows an alternating current voltage waveform of the invention.

When liquid crystals having a memory function such as ferroelectric liquid crystals are used, voltage may not be applied continuously in the erasing period or the writing period as in the alternating current voltage waveforms shown in FIGS. 4–15, but can be applied only in a short period as in FIGS. 16A, 16B, 16C and 16D. FIG. 16A shows an alternating current voltage waveform with frequency 1/T varying at each cycle while erasing voltage $V_e$, writing voltage $V_w$ and duration ratios ($T_e/T_w$ and $T_{e1}/T_{w1}$) are set constant. FIG. 16B shows an alternating current voltage waveform with erasing voltage $V_e$ and writing voltage $V_w$ varied at each pulse while cycles T and duration ratios ($T_e/T_w$ and $T_{e1}/T_{w1}$) are set constant. FIG. 16C shows an alternating current voltage having two values of erasing voltage $V_e$ and writing voltage $V_w$ while cycles T and duration ratios ($T_e/T_w$ and $T_{e1}/T_{w1}$) are kept constant. Each of the two values of the erasing voltage and the writing voltage appears every other cycle. FIG. 16D shows an alternating current voltage waveform with periods $T_{e1}$ and $T_{w1}$ for the application of erasing voltage $V_{e1}$ and writing voltage $V_{w1}$ varied at each cycle while cycles T, erasing voltage $V_e$ and writing voltage $V_w$ are set constant.

Nematic liquid crystals, super-twist nematic liquid crystals, ferroelectric liquid crystals, antiferroelectric liquid crystals, polymer-dispersed liquid crystals or the like are applied for liquid crystal layer 105. When the ferroelectric liquid crystals or the antiferroelectric liquid crystals are applied, the thickness of liquid crystal layer 105 is kept small, so that photoconductive layer 103 is kept thin. The ferroelectric and antiferroelectric liquid crystals are useful since they are capable of quick response and have a memory function. These properties are obtained even when the mixed material of ferroelectric liquid crystals and antiferroelectric liquid crystals is applied. The transmittivity of ferroelectric liquid crystals has a steep threshold characteristic with respect to voltage, so that the liquid crystals are a suitable material for carrying out a threshold treatment in response to input light. When the polymer-dispersed liquid crystals are used, alignment films 106 and 108 become unnecessary. Polarizer 111 and analyzer 112 also are not required. As a result, output light becomes bright and an element structure and an optical system become simple.

Liquid crystal layer 105 is sealed with resin, and spacers (not shown in FIG. 1) are mixed in liquid crystal layer 105 so as to arrange the thickness. Beads made of alumina, glass or quartz, glass fiber powder, or the like are used as the spacers. The spacers are also mixed in the resin sealing liquid crystal layer 105. Alignment films 106 and 108 for aligning the liquid crystals are $SiO_x$ oblique evaporated layers or organic polymer thin films, made of polyimide, polyvinyl alcohol or the like and treated with a rubbing treatment.

A material that can be formed as a film in a wide area at a relatively low temperature (less than 400° C.), can generate photocarrires efficiently in response to the irradiation of writing light 110 and can efficiently transport the photocarriers to the side of liquid crystal layer 105 is preferable for photoconductive layer 103. More specifically, a single layer of hydrogenated amorphous semiconductor such as a-Si:H, hydrogenated amorphous germanium (a-Ge:H), hydrogenated amorphous silicon carbide (a-$Si_{1-x}C_x$:H where $0<x<1$), hydrogenated amorphous silicon germanium (a-$Si_{1-x}Ge_x$:H), hydrogenated amorphous germanium carbide (a-$Ge_{1-x}C_x$:H), and hydrogenated amorphous germanium nitride (a-$Ge_{1-x}N_x$:H), or a laminated layer including of at least two layers of the above-mentioned hydrogenated amorphous semiconductor is applied. Halogen atoms such as F and Cl, and hydrogen may be added to the hydrogenated amorphous semiconductor mentioned above, thus efficiently reducing a dangling bond which works as a carrier trap. Moreover, a small amount (for instance, 0.1–10% by atom) of oxygen (O) atoms or nitrogen atoms may be added to the semiconductor.

If photoconductive layer 103 has rectifying properties, photocarriers are efficiently generated with respect to the incidence of writing light 110. Then, the photo carrier is transported efficiently to the side of liquid crystal layer 105. The rectifying properties are added to photoconductive layer 103 When p/i, i/n and p/i/n structures are formed inside the photoconductive layer (i layer is an undoped layer.). In order to form a p-type layer, a p-type impurity such as B, Al and Ga can be added at $1\times10^{-4}$–10 atom %. The thickness of the p-type layer is preferably 1–$10^3$ nm, more preferably 2–$3\times10^2$ nm, and most preferably 5–30 nm. An n-type layer can be formed by adding an n-type impurity such as P, As and Sb at $1\times10^{-4}$–10 atom %. The n-type layer is preferably 1–$3\times10^3$ nm thick, more preferably 10–$2\times10^3$ nm, and most preferably 50–$1\times10^3$ nm. When liquid crystals which switch due to the polarity of voltage (e.g., ferroelectric liquid crystals, antiferroelectric liquid crystals, etc.) are used for liquid crystal layer 105, image, images written in liquid crystal layer 105 can be erased by the application of forward bias. The thickness of photoconductive layer 103 is determined by the correlation with liquid crystal layer 105, but is generally 0.5–10 μm.

As reflector 104, a multi-layered dielectric mirror, in which the thin film of a large dielectric constant material such as $TaO_2$ and Si and the thin film of a small dielectric constant material such as MgF and $SiO_2$ are alternately laminated, is used.

Figure 2A:
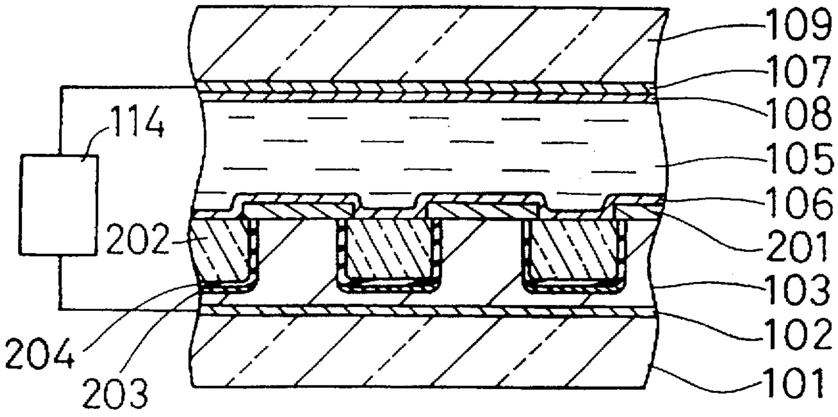
FIG. 2A is a cross-sectional view of another spatial light modulator applied to one embodiment of the driving method of the invention.
Figure 2B:
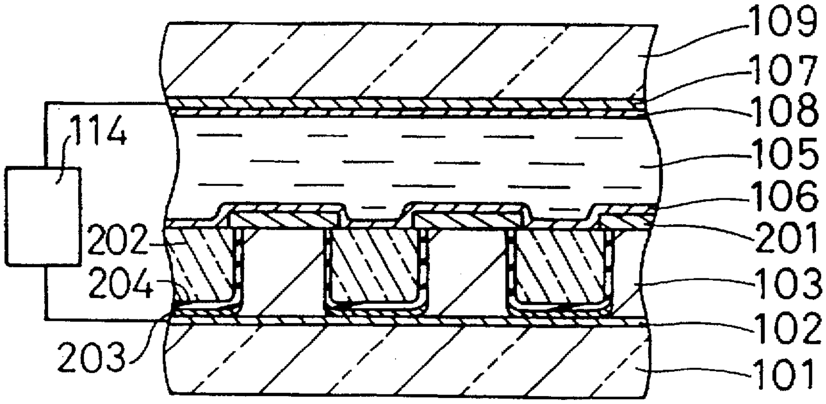
FIG. 2B is a cross-sectional view of the spatial light modulator of the invention.

FIGS. 2A and 2B show other examples of the spatial light modulator of the invention. In the spatial light modulators shown in the figures, metallic thin films made of a material with a large reflectance such as Al, Ag, Mo, Ni, Cr, Mg and Ti are discontinuously formed as the reflector, so that an insular reflector 201 arranged in a two-dimensional matrix or mosaic state is applied. If the reflector is formed continuously, no potential difference is generated and the formation of images becomes impossible. Each section of insular reflector 201 corresponds to one picture element. Photoconductive layer 103 between areas of insular reflector 201 is removed by etching, thus preventing the horizontal diffusion of photocarriers and providing high resolution corresponding to the arrangement of insular reflector 201.

When image, images are read out by irradiating light with large intensity, readout light 113 enters photoconductive layer 102, which generates photocarriers, through gaps between the sections of insular reflector 201. As a result, the undesirable switching of liquid crystal layer 105 occurs. It is preferable to remove photoconductive layer 103 between the sections of insular reflector 201 entirely as shown in FIG. 2B. However, photoconductive layer 103 can be left as shown in FIG. 2A as long as it is at a thickness so that visible rays are hardly absorbed and can transmit (less than 1.5 μm thick, or more preferably less than 0.5 μm). Moreover, a light abosrbing layer 202 for absorbing visible rays (for instance, organic polymer in which carbon particles are dispersed, organic polymer mixed with black pigment or black dye, or an inorganic thin film such as a-C:H, a-Ge:H and a-$Ge_{1-x}N_x$) may be formed in the gaps between the sections of the insular reflector 201, so that readout light 113 leaked from the reflector can be efficiently absorbed. In order to completely shield out readout light 113, a metal light blocking film 203 made of Al, Ag, Mo, Ni, Cr or Mg can be formed on the bottom of the gaps. If an insulating film 204 is formed on the gaps, electric insulation between the sections of insular reflector 201 becomes complete. The insulating film 204 is made of an inorganic insulating material such as $SiO_x$, $SiN_x$, $SiC_x$, $GeO_x$, $GeN_x$, $GeC_x$, $AlO_x$, $A1N_x$, $BC_x$, and $BN_x$, or an organic insulating material such as polyimide, polyvinyl alcohol, polycarbonate, poly-p-xylene, polyethylene terephthalate, polypropylene, poly(vinyl chloride), poly (vinylidene chloride), polystyrene, poly(ethylene tetrafluoride), poly(ethylene chloride trifluoride), polyvinylidene fluoride, propylene hexafluorideethylene tetrafluoride copolymer, ethylene trifluoridevinylidene copolymer fluoride, polybutene, polyvinyl butyral, and polyurethane.

The invention will be explained in a further detail in the following examples.

EXAMPLE 1

As shown in FIG. 1, a 0.05–0.2 μm thick ITO film was formed on a glass substrate 101 by a sputtering method, and a transparent conductive electrode 102 was then formed. The substrate was then placed in a plasma CVD apparatus, and the substrate was heated by a heater at 280° C. after the vacuum chamber was exhausted to less than $1\times10^{-5}$ Torr. To the vacuum chamber, 400 sccm $B_2H_6$ having 10 ppm (1 ppm=$1\times10^{-6}$) and diluted with He, 1 sccm $SiH_4$, and 0.2 sccm $C_2H_2$ were introduced. The pressure of the chamber was maintained at 0.5–0.8 Torr. Plasma was generated by applying 20–30W radio frequency electric power of 13.56 MHz frequency to the electrode, so that a 5–50 nm thick p-type a-$Si_{1-x}C_x$:H layer was formed on transparent conductive electrode 102. After exhausting the vacuum chamber to a high vaccum level, 100 sccm $H_2$ and 40 sccm $SiH_4$ were introduced to the chamber. The pressure in the chamber was set to 0.5–0.8 Torr. Then, a 2–5 μm thick i-type a-Si:H layer was formed on the p-type a-$Si_{1-x}C_x$:H layer by generating plasma with the application of 15–30W radio frequency electric power of 13.56 MHz to the electrode. The vacuum chamber was again exhausted to a high vacuum level, and 160 sccm $N_2$ and 1 sccm $GeH_4$ were then introduced to the chamber. The pressure in the chamber was maintained at 0.5 Torr. Plasma was generated by applying 20W radio frequency electric power of 13.56 MHz frequency to the electrode, so that a 0.3–1 μm thick i-type a-$Ge_{1-x}N_x$:H layer ($0.1\leqq x\leqq0.4$) was formed on the i-type a-Si:H layer. As a result, a photoconductive layer 103 having rectifying properties was formed on transparent conductive electrode 102. Then, $1.5\times10^2$ nm thick Si and $SiO_2$ layers were alternately laminated for three to ten layers each on photoconductive layer 103 by a sputtering deposition method, thus forming a multi-layered dielectric reflective layer 104. A polyimide alignment layer 106 treated with a rubbing treatment was then laminated on multi-layered dielectric reflective layer 104. A spatial light modulator (1) was manufactured by sandwiching a 0.8–1.3 μm thick ferroelectric liquid crystal layer 105 between glass substrate 101 and a glass substrate 109 which was already laminated with a transparent conductive electrode 107 (ITO) and a polyimide alignment film 108.

Instead of the i-type a-$Ge_{1-x}N_x$ of photoconductive layer 103, an n-type a-Si:H layer was formed by applying $PH_3$:50–100 sccm, having 100 ppm density and diluted with $H_2$, and $SiH_4$5–20 sccm, thus manufacturing a spatial light modulator (2). An alternating current voltage having a waveform shown in FIG. 4 (erasing voltage $V_e$=15V, erasing voltage $V_w$=−3V, duration ratio $(T_e/T_w)$=1/10, change in cycle T=1–16 m sec) was applied to a section between transparent conductive electrodes 102 and 107 of spatial light modulators (1) and (2). White light was used as writing light 110, and a He-Ne laser (633 nm) was applied as readout light 113. The voltage was applied so as to set transparent conductive electrode 102 positive.

The operation of the spatial light modulator is now explained below. Writing light 110 was irradiated while negative voltage $V_w$ was applied for reverce-biasing photoconductive layer 103. Thus, voltage applied to liquid crystal layer 105 increased, switching the liquid crystals from the off-state to on-state. The on-state of the liquid crystals were observed as reflecting light from reflector 104 by irradiating readout light 113 from the side opposite to the side of writing light 110. Positive voltage $V_e$ for biasing photoconductive layer 103 forward was applied, so that liquid crystal layer 105 was changed to the off-state with or without the irradiation of writing light 110.

Under these operational conditions, spatial light modulator (1) had 150–280μW/cm² photosensitivity, 30–50μ sec rise time, and 25–50 lp (line pairs)/mm (MTF=10%) resolution. On the other hand, spatial light modulator (2) had 90–120 μW/cm² photosensitivity, 30–50μ sec rise time, and 20–40 lp/mm (MTF=10%) resolution.

Figure 3:
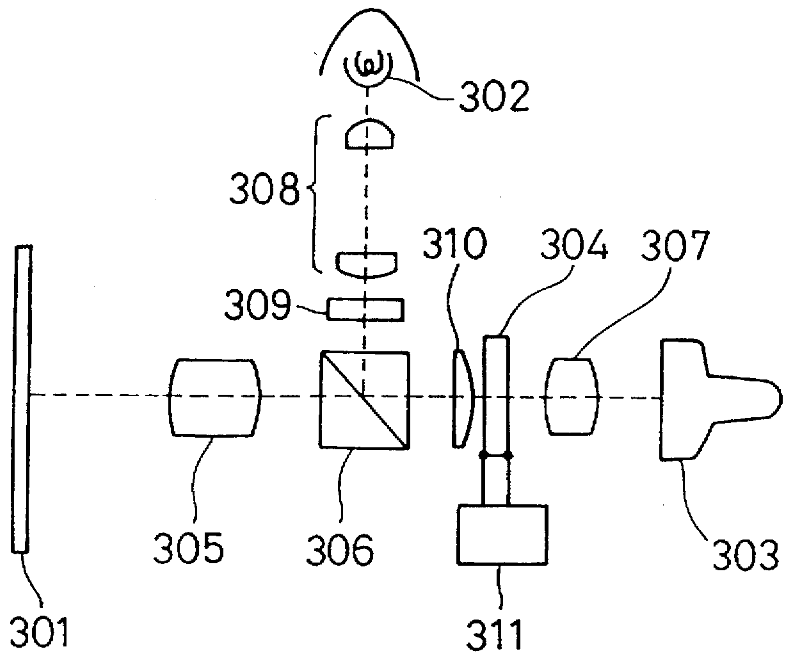
FIG. 3 is a schematic view of a projection display system of the invention.

Spatial light modulators (1) and (2) were inserted in the projection display apparatus shown in FIG. 3. As shown in FIG. 3, the projection display apparatus includes of a spatial light modulator 304, an AC power supply 311, a cathode ray tube (CRT) 303, an image formation lens (image formation means) 307, a light source for projection 302, and a lens for projection 305. The AC power supply is connected to the transparent conductive electrodes of spatial light modulator 304, and is used for driving the modulator. The cathode ray tube (CRT) is applied as a writing light source (image, images input means) providing image, images to spatial light modulator 304. The image formation lens is for focusing image, images output from CRT 303 on the photoconductive layer of spatial light modulator 304. The light source for projection reads out the output images from spatial light modulator 304. The lens for projection enlarges the output images from spatial light modulator 304 by 40 times onto a screen 301 having a white color diffusing surface. In FIG. 3, 306 indicates a polarizing beam splitter, 308 is a relay lens system, 309 is a prepolarizer, and 310 is a supplementary lens. A metal halide lamp including a reflector is used as a light source for projection 302. The output waveform from AC power supply 311 has the same properties mentioned above.

While negative voltage $V_w$ for reverce-biasing photoconductive layer 103 was applied, image, images displayed on CRT 303 were written in spatial light modulator 304. The written image, images were then projected onto screen 301. When positive voltage $V_e$ was applied, photoconductive layer 103 was biased forward, thus erasing the written image, images. Illuminance on spatial light modulator 304 was 2,000,000 lx when metal halide lamp 302 was on. The black and white contrast on screen 301 was 200:1 for both spatial light modulators (1) and (2). The resolution was evaluated by a resolution chart, and was 900 TV lines. The image, images projected onto screen 301 had no fluctuation of brightness and "beat". The brightness distribution around the center of screen 301 was within ±2%.

Figure 17:
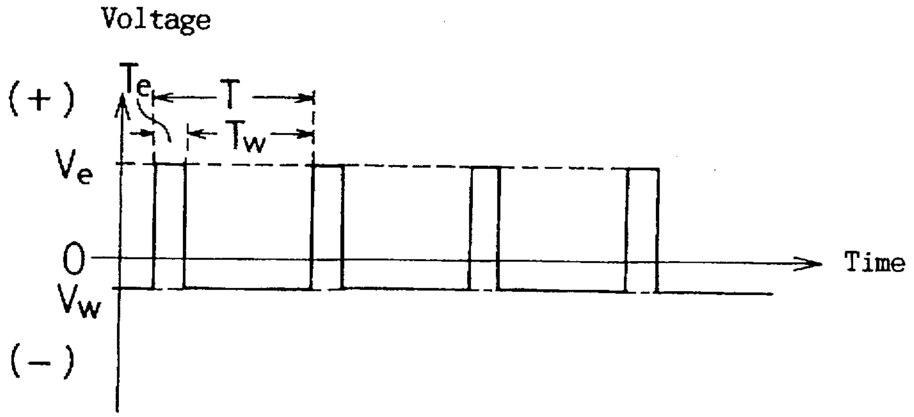
FIG.17 (PRIOR ART)
FIG. 17 shows the driving voltage waveform of a conventional spatial light modulator.

As a comparison, an alternating current voltage having a conventional waveform as shown in FIG. 17 (erasing voltage $V_e$=15V, writing voltage $V_w$=−3V, duration ratio $(T_e/T_w)$=1/10, cycle T=6 m sec) was applied to spatial light modulators (1) and (2), and projected image, images were tested. According to the results, beat (flickering due to bands with different brightness) was found on the image, images, and it was difficult to view the images. The brightness distribution around the center of screen 301 was about ±20% because of the beat.

In the projection display apparatus shown in FIG. 3, written image, images are provided by CRT 303. However, instead of the CRT, another display such as a liquid crystal display, a plasma display, an electro-luminescent device, a light emitting diode array, a laser diode with a two-dimensional scanning system using a polygon mirror or an acousto-optical device may be used.

EXAMPLE 2

As shown in FIG. 2(*a*), a 0.05–0.2 μm thick ITO film was formed on a glass substrate 101 by a sputtering method, thus forming a transparent conductive electrode 102. As in Example 1, a 5–50 nm thick p-type a-$Si_{1-x}C_x$ layer, 1.4–4.0 μm thick i-type a-Si:H layer, and 0.1–1.0 μm n-type a-Si:H layer were sequentially laminated on transparent conductive electrode 102, thus forming a photoconductive layer 103. On the surface of photoconductive layer 103, Cr was laminated at $2\times10^2$–$5\times10^2$ nm thickness by a vacuum evaporation method, and was then patterned by photolithography, thus forming an insular reflector 201. The shape of insular reflector 201 was 24 μm×24 μm square, and the reflector was arranged in a 1000×2000 matrix condition with 2 μm gap in-between. Besides the photolithography, a lift-off method can also be applied to form the insular reflector. The a-Si:H layer of photoconductive layer 103 between insular reflector 201 was removed by etching, thus forming grooves. By a vacuum evaporation method, 50–100 nm thick Al was deposited on insular reflector 201 and the grooves. Insular reflector 201 had the two-layered structure of Al film and Cr film. The Al film formed on the grooves shields out readout light 113, and was a metal light blocking film 203. An insulating film 204 made of polyimide was also formed on the grooves at $1\times10^2$–$3\times10^2$ nm thickness. Resist including carbon particles was coated and filled in the grooves, thereby forming a light absorbing layer 202. The polyimide film and the resist film on insular reflector 201 were removed by a dry etching. On insular reflector 201 and light absorbing layer 202, a 10–30 nm thick polyimide film was then formed, and was treated with a rubbing treatment, thus forming a polyimide alignment film 106. As a result, a first substrate was prepared. Similarly, a second substrate was prepared by laminating a transparent conductive electrode 107 (ITO) and a polyimide alignment film 108 on a glass substrate 109. A 0.8–2 μm thick ferroelectric liquid crystal layer 105 was sandwiched between the first and the second substrate, so that a spatial light modulator (3) shown in FIG. 2(*a*) was prepared.

A spatial light modulator (4) shown in FIG. 2(*b*) was also prepared by removing the entire photoconductive layer 103 between insular reflector areas 201 by etching.

As in Example 1, spatial light modulators (3) and (4) were evaluated. According to the results, both had 80 μW/$cm^2$ photo sensitivity and 30μ sec rise time.

As in Example 1, spatial light modulators (3) and (4) were inserted in the projection display apparatus shown in FIG. 3, and output image, images on a screen 301 were tested. The alternating current voltage waveform shown in FIG. 4 was applied as the output waveform from an AC power supply 311. More specifically, the output waveform had 15V erasing voltage $V_e$, −1.5V writing voltage $V_w$, and 1/10 duration ratio ($T_e/T_w$). The cycle had 0.4–30 m sec fluctuation width with respect to 3 m sec central cycle. As a comparison, alternating current voltage having a conventional waveform (erasing voltage $V_e$=15V, writing voltage $V_w$=−1.5V, duration ratio ($T_e/T_w$)=1/10) shown in FIG. 17 was applied, and the output image, images were tested. With the conventional alternating current voltage waveform, the brightness distribution around the center of screen 301 was within ±35%, and it was difficult to view the image, images since a clear beat was found. However, when the alternating current voltage waveform shown in FIG. 4 (waveform of the invention) was applied, the brightness distribution around the center of screen 301 was within ±2.5%, and beautiful image, images with no beat were observed. When the fluctuation width of the cycle was 0.01–100 m sec with respect to 3 m sec central cycle, undesirable light and shade of image, images were observed.

EXAMPLE 3

Spatial light modulators (3) and (4) were applied to the projection display systems shown in FIG. 3. Alternating current voltage having a waveform shown in FIG. 4 was applied from an AC power supply 311, and output image, images on a screen 301 were tested. More specifically, the alternating current voltage waveform had 15V erasing voltage $V_e$, −2.5V writing voltage $V_w$, and 1/5 duration ratio ($T_e/T_w$). The cycle had ±1.4 m sec fluctuation width with respect to 16.7 m sec central cycle. The brightness distribution around the center of screen 301 was within ±2.5%, and beautiful image, images with no beat were obtained.

EXAMPLE 4

Spatial light modulators (3) and (4) were used in the projection display system shown in FIG. 3. Alternating current voltage having a waveform shown in FIG. 5 was applied from an AC power supply 311, and output image, images on a screen 301 were tested. More specifically, the alternating current voltage waveform had 5–20V fluctuation width of erasing voltage $V_e$, −0.1–5V fluctuation width of writing voltage $V_w$, 1/10 duration ratio ($T_e/T_w$), and 4 m sec cycle T. Picture images of high contrast (200:1) were obtained, and no persistence and sticking were found.

EXAMPLE 5

Spatial light modulator (2) was used in the projection display system shown in FIG. 3. Alternating current voltage having a waveform shown in FIGS. 6A, 6B, 6C and 6D was applied from an AC power supply 311, and output image, images on a screen 301 were tested. More specifically, the alternating current voltage waveform had 20V high erasing voltage $V_e$ and 10V low erasing voltage $V_e$, −3.5V writing voltage $V_w$, 1/50 duration ratio ($T_e/T_w$), and 4 m sec cycle T. Picture images of high contrast (180:1) and resolution (900TV) were obtained, and no persistence and sticking were found.

EXAMPLE 6

Spatial light modulator (2) was used in the projection display system shown in FIG. 3. Alternating current voltage having a waveform shown in FIGS. 7A, 7B, 7C and 7D was applied from an AC power supply 311, and output image, images on a screen 301 were tested. More specifically, the alternating current voltage waveform had 15V erasing voltage $V_e$, −4V large writing voltage $V_w$ and −2V small writing voltage $V_w$, 1/10 duration ratio ($T_e/T_w$), and 4 m sec cycle T. Picture images of high contrast (200:1) and resolution (900TV) were obtained, and no persistence and sticking were found.

EXAMPLE 7

Spatial light modulators (3) and (4) were used in the projection display system shown in FIG. 3. Alternating current voltage having a waveform shown in FIGS. 8A, 8B, 8C and 8D was applied from an AC power supply 311, and output image, images on a screen 301 were tested. More specifically, the alternating current voltage waveform had 15V erasing voltage $V_e$; −1V initial writing voltage $V_w$, 14V maximum $V_{w2}$ and −2V $V_{w3}$, 1/10 duration ratio ($T_e/T_w$), and 16.7 m sec cycle T. Picture images of high contrast (200:1) and uniform brightness were obtained. (There was only a 10% reduction in brightness relative to the brightness at the center when the angle of view was 0.9.) No persistence and sticking were observed. However, the disbribution of brightness was increased by 30% with 0.9 angle of view when the conventional alternating current voltage waveform shown in FIG. 17 was applied.

EXAMPLE 8

Spatial light modulators (3) and (4) were used in the projection display system shown in FIG. 3. Alternating current voltage having a waveform shown in FIGS. 10A and 10B was applied from an AC power supply 311, and output image, images on a screen 301 were tested. More specifically, the alternating current voltage waveform had −1.5V writing voltage $V_w$, 1/10 duration ratio ($T_e/T_w$) and 1 m sec cycle T. The range of erasing voltage $V_e$ was from 0.5V to 50V with respect to 5V average voltage at 10 cycles. Picture images of high contrast (180:1) and high resolution (950TV) were obtained. No persistence and sticking were observed. When the range of erasing voltage $V_e$ was from 0.1V to 100V with respect to 5V average voltage at 10 cycles, the brightness of image, images declined by 20%. Thus, it was not preferable.

EXAMPLE 9

Spatial light modulators (3) and (4) were used in the projection display system shown in FIG. 3. Alternating current voltage having a waveform shown in FIGS. 10C and 10D was applied from an AC power supply 311, and output image, images on a screen 301 were tested. More specifically, the on a screen 301 were tested. More specifically, the alternating current voltage waveform had −1.5V erasing voltage $V_e$, 1/10 duration ratio ($T_e/T_w$), and 1 m sec cycle T. The range of writing voltage $V_w$ was from −15V to −0.15V with respect to −1.5V average voltage at 10 cycles. Picture images of high contrast (180:1) and high resolution (1000TV) were obtained. When the range of writing voltage $V_w$ was from −50V to −0.05V with respect to −1.5V average voltage at 10 cycles, the contrast declined to 20:1 and was not preferable.

EXAMPLE 10

Spatial light modulators (3) and (4) were used in the projection display system shown in FIG. 3. Alternating current voltage having a waveform shown in FIG. 11C was applied from an AC power supply 311, and output image, images on a screen 301 were tested. More specifically, the alternating current voltage waveform had −2.5V writing voltage $V_w$, 1/10 duration ratio ($T_e/T_w$), and 1.25 m sec cycle T. High erasing voltage $V_{e1}$ was 20V while low erasing voltage $V_{e2}$ was 15V, and (l), (m), (n) and (u) were set from 1 to 50. As a result, image, images of high contrast (150:1) and high resolution (950TV) were obtained. No persistance and sticking were observed. However, when (l) and (m) were set 50 times or more higher than (n) and (u), residual images of about 150 m sec were found and were not preferable. With (n) and (u) 50 times higher than (l) and (m), the contrast declined to 80:1, and the resolution also decreased to 700TV. Furthermore, the brightness of image, images declined fully by 20%.

EXAMPLE 11

Spatial light modulators (3) and (4) were used in the projection display system shown in FIG. 3. Alternating current voltage having a waveform shown in FIG. 12C was applied from an AC power supply 311, and output image, images on a screen 301 were tested. More specifically, the alternating current voltage waveform had 15V erasing voltage $V_e$, 1/10 duration ratio ($T_e/T_w$), and 1.25 m sec cycle T. High writing voltage $V_{w1}$ was −1V while low writing voltage $V_{w2}$ was −5V, and (q), (w), (r) and (t) were set from 1 to 50. As a result, image, images of high contrast (180:1) aud high resolution (1000TV) were obtained. However, when (q) and (r) were set 50 times or more higher than (s) and (t), the contrast declined to less than 50:1 and was not preferable. With (s) and (t) 50 times greater than (q) and (r), the brightness of image, images declined fully by 50%.

EXAMPLE 12

Spatial light modulators (3) and (4) were used in the projection display system shown in FIG. 3. Alternating current voltage having a waveform shown in FIG. 13A was applied from an AC power supply 311, and output image, images on a screen 301 were tested. More specifically, the alternating current voltage waveform had 15V erasing voltage $V_e$, and −1.5V writing voltage $V_w$, at 330 Hz frequency. The range of erasing period $T_e$ was from 0.01 m to 10 m sec with respect to 0.1 ms average value at 10 cycles. As a result, image, images of high contrast (150:1) and high resolution (950TV) were obtained. However, when the range of erasing period $T_e$ was set from 0.001 m sec to 30 m sec with respect to 0.1 m sec average value at 10 cycles, undesirable flickering was found in the image, images.

EXAMPLE 13

Spatial light modulators (3) and (4) were used in the projection display system shown in FIG. 3. Alternating current voltage having a waveform shown in FIG. 13B was applied from an AC power supply 311, and output image, images on a screen 301 were tested. More specifically, the alternating current voltage waveform had 15V erasing voltage $V_e$, −1.5V writing voltage $V_w$, and 16 m sec writing period $T_w$. The fluctuation width of erasing period $T_e$ was from 0.07 m sec to 7 m sec with respect to 0.7 m sec average value at 10 cycles. As a result, image, images of high contrast (150:1) and high resolution (950TV) were obtained, and no persistence and sticking were found. However, when the range of erasing period $T_e$ was set from 0.007 m sec to 16 m sec with respect to 0.7 m sec average value at 10 cycles, undesirable flickering was found in the image, images.

EXAMPLE 14

Spatial light modulators (3) and (4) were used in the projection display system shown in FIG. 3. Alternating current voltage having a waveform shown in FIG. 13C was applied from an AC power supply 311, and output image, images on a screen 301 were tested. More specifically, the alternating current voltage waveform had 15V erasing voltage $V_e$, −1.5V writing voltage $V_w$, and 0.03 m sec erasing period $T_e$. The range of writing period $T_w$ was from 0.16 m sec to 16 m sec with respect to 1.6 m sec average value at 10 cycles. As a result, image, images of high contrast (180:1) and high resolution (1000TV) were obtained. However, when the range of writing period $T_w$ was set from 0.016 m sec to 160 m sec with respect to 1.6 m sec average value at 10 cycles, undesirable flickering was found in the image, images.

EXAMPLE 15

Spatial light modulators (3) and (4) were used in the projection display system shown in FIG. 3. Alternating current voltage having a waveform shown in FIG. 14A was applied from an AC power supply 311, and output image, images on a screen 301 were tested. More specifically, the alternating current voltage waveform had −1.5V writing voltage $V_w$, 1/10 duration ratio ($T_e/V_w$), and 10–20V range of erasing voltage $V_e$. The cycle had 1–10 m sec range with respect to 3.3 m sec central cycle. As a result, image, images of high contrast (150:1) and high resolution (950TV) were obtained, and no persistence and sticking were found.

EXAMPLE 16

Spatial light modulators (3) and (4) were used in the projection display system shown in FIG. 3. Alternating current voltage having a waveform shown in FIG. 14B was applied from an AC power supply 311, and output image, images on a screen 301 were tested. More specifically, the alternating current voltage waveform had −15V erasing voltage $V_e$, 1/10 duration ratio ($T_e/V_w$), and −0.5–5V range of writing voltage $V_w$. The cycle had 1–10 m sec range with respect to 3.3 m sec central cycle. As a result, image, images of high contrast (180:1) and high resolution (1000TV) were obtained.

EXAMPLE 17

Spatial light modulators (3) and (4) were used in the projection display system shown in FIG. 3. Alternating current voltage having a waveform shown in FIG. 15 was applied from an AC power supply 311, and output image, images on a screen 301 were tested. More specifically, the alternating current voltage waveform had 25V erasing voltage $V_{e1}$, 15V $V_{e2}$, and 10V $V_{e3}$; and −5V writing voltage $V_{w1}$, −2V $V_{w2}$, and −0 5V $V_{w3}$. The average duration ratio ($T_e/V_w$) at 10 cycles was 1/10, and the range was 1/100-1. The average value of cycle T at 10 cycles was 3.3 m sec, and the range was 1–10 m sec. As a result, image, images of high contrast (180:1) and high resolution (1000 TV) were obtained, and no persistence and sticking were found.

EXAMPLE 18

Spatial light modulators (3) and (4) were used in the projection display system shown in FIG. 3. Alternating current voltage having a waveform shown in FIG. 16A was applied from an AC power supply 311, and output image, images on a screen 301 were tested. More specifically, the alternating current voltage waveform had 15V erasing voltage $V_e$, −5V writing voltage $V_w$, and 1 duration ratios ($T_e/T_w$ and $T_{e1}/T_{w1}$). The average value of cycle T at 10 cycles was 3 m sec, and the range was 0.3–30 m sec. As a result, image, images of high contrast (120:1) and high resolution (800TV) were obtained, and no persistence and sticking were found.

The spatial light modulators mentioned above can also be applied as an element for displaying a dynamic hologram. The liquid crystal layer, photoconductive layer, insulating layer, light absorbing layer, and alternating current voltage waveform of the invention are not limited to the ones mentioned in the above-noted examples. In the projection display apparatus shown in FIG. 3, a color image, images can be output onto a screen when three CRTs for providing each image of R (red), G (green) and B (blue) are combined with three spatial light modulators and a color separation optical system (and, if necessary, a color composition optical system) is inserted into a readout optical system.

The invention may be embodied in other forms without departing from the spirit or essential characteristics thereof. The embodiments disclosed in this application are to be considered in all respects as illustrative aud not restrictive, the scope of the invention is indicated by the appended claims rather than by the foregoing description, and all changes which come within the meaning and range of equivalency of the claims are intended to be embraced therein.

What is claimed is:

1. A driving method for a spatial light modulator comprising a step of applying alternating current voltage to a section between transparent conductive electrodes; said spatial light modulator comprising at least two transparent insulating substrates having said transparent conductive electrodes, a photoconductive layer, a liquid crystal layer and a reflector; said photoconductive layer, said liquid crystal layer, and said reflector being sandwiched between said transparent insulating substrates; said reflector being sandwiched between said photoconductive layer and said liquid crystal layer; said alternating current voltage having a waveform of alternately appearing first voltage with a predetermined polarity and second voltage with a polarity opposite to said predetermined polarity of said first voltage; wherein at least one selected from the group consisting of AC cycles, said first voltage in each cycle or said second voltage in each cycle, said first voltage in one cycle of said alternating current voltage or said second voltage in one cycle of said alternating current voltage, and a ratio between a period of said first voltage and a period of said second voltage, is not constant.

2. The driving method of claim 1, wherein the first voltage has an absolute value that is larger than that of the second voltage.

3. The driving method of claim 1, wherein the period of the first voltage is shorter than the period of the second voltage.

4. The driving method of claim 1, wherein the alternating current voltage comprises cycles, fluctuating within a range from $T_o/10$ to $10T_o$ where $T_o$ is a median cycle.

5. The driving method of claim 1, wherein the alternating current voltage comprises varying cycles with constant voltage.

6. The driving method of claim 1, wherein the first voltage in one cycle of the alternating current voltage becomes small as time passes.

7. The driving method of claim 1, wherein the second voltage in one cycle of the alternating current voltage becomes small as time passes.

8. The driving method of claim 1, wherein the second voltage in one cycle of the alternating current voltage has at least one maximum value or minimum value.

9. The driving method of claim 1, wherein at least one voltage selected from the group consisting of the first voltage and the second voltage is different in one cycle or in roughly ten cycles.

10. The driving method of claim 1, wherein at least one voltage selected from the group consisting of the first voltage and the second voltage ranges from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}.

11. The driving method of claim 1, wherein the ratio between the period of the first voltage and the period of the second voltage ranges from 0.1 to 10.

12. The driving method of claim 1, wherein the photoconductive layer has rectifying properties.

13. The driving method of claim 1, wherein the liquid crystal layer comprises at least one material selected from the group consisting of ferroelectric liquid crystals aud antiferroelectric liquid crystals.

14. A projection display system comprising a spatial light modulator, an AC power supply, an image, images input means, an image, images formation means, a light source, and projection lenses; said spatial light modulator comprising at least two transparent insulating substrates, a photoconductive layer, a liquid crystal layer, and a reflector deposited on one plane between said photoconductive layer and said liquid crystal layer; said photoconductive layer, said liquid crystal layer, and said reflector being placed in a section between said two transparent insulating substrates having transparent conductive electrodes; wherein said AC power supply drives said spatial light modulator and is connected to a section between said transparent conductive electrodes; wherein said image, images input means provides image, images to said spatial light modulator; wherein said image, images formation means forms image, images output from said image, images input means on said photoconductive layer; wherein said light source reads out image, images output from said spatial light modulator; wherein alternating current voltage output from said AC power supply has a waveform of alternately appearing first voltage with a predetermined polarity and second voltage having polarity opposite to said predetermined polarity of said first voltage; wherein at least one selected from the group consisting of AC cycles, said first voltage in each cycle or said second voltage in each cycle, said first voltage in one cycle of said alternating current voltage or said second voltage in one cycle of said alternating current voltage, and a ratio between a period of said first voltage and a period of said second voltage, is not constant.

15. The projection display system of claim 14, wherein the first voltage has an absolute value that is larger than that of the second voltage.

16. The projection display system of claim 14, wherein the period of the first voltage is shorter than the period of the second voltage.

17. The projection display system of claim 14, wherein the alternating current voltage comprises cycles, fluctuating within a range from $T_o/10$ to $10T_o$ where $T_o$ is a median cycle.

18. The projection display system of claim 14, wherein the alternating current voltage comprises cycles, fluctuating within a range from $T_o/10$ to $10T_o$ where $T_o$ is a median cycle.

19. The projection display system of claim 14, wherein the alternating current voltage comprises varing cycles with constant voltage.

20. The projection display system of claim 14, wherein the first voltage in one cycle of the alternating current voltage becomes small as time passes.

21. The projection display system of claim 14, wherein the second voltage in one cycle of the alternating current voltage becomes small as time passes.

22. The projection display system of claim 14, wherein the second voltage in one cycle of the alternating current voltage has at least one maximum value or minimum value.

23. The projection display system of claim 14, wherein at least one voltage selected from the group consisting of the first voltage and the second voltage is different in one cycle or in roughly ten cycles.

24. The projection display system of claim 14, wherein at least one voltage selected from the group consisting of the first voltage and the second voltage ranges from $V_o/10$ to $10V_o$ where $V_o$ is a time average value equal to {the sum of (voltage multiplied by application time per cycle) for at least ten voltage cycles} divided by {the sum of (application time per cycle) for at least ten voltage cycles}.

25. The projection display system of claim 14, wherein the ratio between the period of the first voltage and the period of the second voltage ranges from 0.1 to 10.

26. The projection display system of claim 14, wherein the image, images input means comprises a cathode ray tube.

* * * * *

UNITED STATES PATENT AND TRADEMARK OFFICE
CERTIFICATE OF CORRECTION

PATENT NO. : 5,731,797 PAGE 1 of 4

DATED : MARCH 24, 1998

INVENTOR(S) : AKIYAMA ET AL.

It is certified that error appears in the above-identified patent and that said Letters Patent is hereby corrected as shown below:

At column 3, line 63, change "current voltage (AC)" to —current (AC) voltage—.

At column 4, line 49, change "and a of reflector" to —and a reflector—.

At column 6, line 64, change "$T_0$/10" to —$T_0$/10—.

At column 9, line 67, change "$T_e/T_w$" to —$T_e/T_w$—.

At column 10, lines 48 and 54, change "$T_e/T_w$" to —$T_e/T_w$—.

At column 11, lines 13, 30 and 44, change "$T_e/T_w$" to —$T_e/T_w$—.

At column 12, lines 3, 16, 29 and 53, change "$T_e/T_w$" to —$T_e/T_w$—.

At column 13, lines 36, 39, 44 and 66, change "$T_e/T_w$" to —$T_e/T_w$—.

At column 14, lines 3, 7, 41, 61 and 65, change "$T_e/T_w$" to —$T_e/T_w$—.

At column 14, lines 61 and 65, change "$T_{el}/T_{wl}$" to —$T_{el}/T_{wl}$—.

At column 15, line 1, change "$T_e/T_w$" to —$T_e/T_w$—.

At column 15, line 1, "$T_{el}/T_{wl}$" to —$T_{el}/T_{wl}$—.

UNITED STATES PATENT AND TRADEMARK OFFICE

CERTIFICATE OF CORRECTION

PATENT NO. : 5,731,797 PAGE 2 of 4

DATED : MARCH 24, 1998

INVENTOR(S) : AKIYAMA ET AL.

It is certified that error appears in the above-identified patent and that said Letters Patent is hereby corrected as shown below:

At column 15, line 56, "0.1–10% by atom" to —0.1–10 atomic %—.

At column 15, line 67, change "$1x10^{-4}$–10 atom %" to —$1x10^{-4}$–10 atomic %—.

At column 16, line 4, change "$1x10^{-4}$–10 atom %" to —$1x10^{-4}$–10 atomic %—.

At column 16, line 47, change "a–$Ge_{1-x}N_x$" to —a–$Ge_{1-x}N_x$:H—.

At column 17, line 43, change "a–$Ge_{1-x}N_x$" to —a–$Ge_{1-x}N_x$:H—.

At column 17, line 49, change "$T_{e/}T_w$" to —$T_e/T_w$—.

At column 17, line 50, change "m sec" to —msec—.

At column 18, lines 48–49, change "$T_{e/}T_w$)=/10" to —$T_e/T_w$=1/10—.

At column 18, line 49, change "m sec" to —msec—.

At column 19, line 1, change "a–$Si_{1-x}C_x$" to —a–$Si_{1-x}C_x$:H—.

At column 19, line 39, change "30μ sec" to —30 μsec—.

At column 19, lines 47 and 51, change "$T_{e/}T_w$" to —$T_e/T_w$—.

CERTIFICATE OF CORRECTION

PATENT NO. : 5,731,797

PAGE 3 of 4

DATED : MARCH 24, 1998

INVENTOR(S) : AKIYAMA ET AL.

It is certified that error appears in the above-identified patent and that said Letters Patent is hereby corrected as shown below:

At column 19, lines 47, 48, 61 and 62, change "m sec" to --msec--.

At column 20, lines 6, 7, 20, 46 and 60, change "m sec" to --msec--.

At column 20, lines 6, 20, 32, 46 and 59, change "$T_e/T_w$" to --$T_e/T_w$--.

At column 20, lines 34 and 48, change "TV" to --TV lines--.

At column 21, lines 9, 27, 44 and 64, change "$T_e/T_w$" to --$T_e/T_w$--.

At column 21, lines 10 and 64, change "m sec" to --msec--.

At column 21, lines 31, 48 and 54, change "TV" to --TV lines--.

At column 22, lines 1, 35 and 54, change "TV" to --TV lines--.

At column 22, line 15, change "0.01 m" to --0.01 msec--.

At column 22, lines 16, 20(two occurrences), 21, 31, 33(three occurrences), 37, 38(two occurrences), 50, 52 and 56(two occurrences), change "m sec" to --msec--.

At column 22, line 67, change "$T_e/V_w$" to --$T_e/T_w$--.

UNITED STATES PATENT AND TRADEMARK OFFICE
CERTIFICATE OF CORRECTION

PATENT NO. : 5,731,797 PAGE 4 of 4

DATED : MARCH 24, 1998

INVENTOR(S) : AKIYAMA ET AL.

It is certified that error appears in the above-identified patent and that said Letters Patent is hereby corrected as shown below:

At column 23, lines 1, 2, 14, 15, 30, 31 and 44, change "m sec" to —msec—.

At column 23, lines 3, 16, 32 and 45, change "TV" to —TV lines—.

At column 23, lines 13 and 28, change "$T_e/V_W$" to —$T_e/T_W$—.

At column 23, line 42, change "$T_e/T_W$" to —$T_e/T_W$—.

At column 23, line 43, change "$T_{e1}/T_{W1}$" to —$T_{e1}/T_{W1}$—.

Signed and Sealed this

Twelfth Day of January, 1999

*Attest:*

*Attesting Officer* *Acting Commissioner of Patents and Trademarks*